United States Patent
Donaldson

(10) Patent No.: US 9,696,801 B2
(45) Date of Patent: Jul. 4, 2017

(54) EYE-CONTROLLED USER INTERFACE TO CONTROL AN ELECTRONIC DEVICE

(71) Applicant: Thomas Alan Donaldson, Nailsworth (GB)

(72) Inventor: Thomas Alan Donaldson, Nailsworth (GB)

( * ) Notice: Subject to any disclaimer, the term of this patent is extended or adjusted under 35 U.S.C. 154(b) by 110 days.

(21) Appl. No.: 14/752,521

(22) Filed: Jun. 26, 2015

(65) Prior Publication Data

US 2015/0378431 A1    Dec. 31, 2015

Related U.S. Application Data

(60) Provisional application No. 62/017,733, filed on Jun. 26, 2014.

(51) Int. Cl.
| | |
|---|---|
| *G06K 9/00* | (2006.01) |
| *G06F 3/01* | (2006.01) |
| *G06T 7/73* | (2017.01) |

(52) U.S. Cl.
CPC ......... *G06F 3/013* (2013.01); *G06K 9/00604* (2013.01); *G06T 7/73* (2017.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 2014/0152792 | A1* | 6/2014 | Krueger | G01C 23/00 348/78 |
| 2014/0226131 | A1* | 8/2014 | Lopez | G06F 1/1626 351/210 |
| 2015/0301338 | A1* | 10/2015 | Van Heugten | G02C 7/04 345/8 |
| 2015/0347733 | A1* | 12/2015 | Tsou | G06F 3/013 726/18 |
| 2015/0378431 | A1* | 12/2015 | Donaldson | G06F 3/013 382/103 |
| 2016/0011658 | A1* | 1/2016 | Lopez | G06F 1/1626 345/156 |

* cited by examiner

*Primary Examiner* — Tahmina Ansari
(74) *Attorney, Agent, or Firm* — Kokka & Backus, PC

(57) ABSTRACT

Techniques for providing an eye-controlled user interface for an electronic device are described. In some examples, a process includes establishing a control link between a device and a visual control circuit, the visual control circuit having an image sensor and a visual feature disposed substantially proximate to the image sensor at a control point, receiving an image by the image sensor, evaluating the image to determine whether an eye is oriented substantially toward the control point, determining whether a control action is intended, and, if the control action is intended, deriving the control action, and using the control link to perform the control action.

19 Claims, 19 Drawing Sheets

300c

301c

302c

304c — Visual Feature

306c — Image Sensor

308c — Processor

318c — Visual Feature

310c — Control Link

To Electronic Device

FIG. 3C

EYE-CONTROLLED USER INTERFACE TO CONTROL AN ELECTRONIC DEVICE

CROSS-REFERENCE TO RELATED APPLICATIONS

This application claims the benefit of U.S. Provisional Patent Application No. 62/017,733, filed Jun. 26, 2014, which is herein incorporated by reference for all purposes.

FIELD

The present disclosure relates generally to control of electronic devices and, more specifically, techniques relating to eye-controlled user interfaces for devices.

BACKGROUND

Conventional visual control of electronic devices includes, typically, the ability to control a device from a distance, while occupied in other tasks. Visual control of electronic devices is also a natural and intuitive form for user interfaces.

Some conventional solutions have attempted to provide visual control by determining a direction in which a user is looking. Such solutions include head-mounted eye-tracking devices, such as helmets or eyeglasses. Other solutions include a camera affixed in place adjacent to the eyes, evaluating the orientation of the eyes relative to the orientation of the head, relative to an orientation of an associated body, and relative to known, predetermined positions of objects in the room.

However, conventional solutions suffer from a number of shortcomings. For example, accurately determining the angle of a user's vision is difficult, particularly in light of occlusions created by an eyelid. Conventional solutions are typically also expensive and overly complex, bulky and inconvenient to carry or to wear, and need extensive calibration to keep track of what objects are in the room and their exact locations. Conventional solutions are also typically intrusive to user privacy.

Thus, what is needed is a solution for an eye-controlled user interface without the shortcomings of conventional solutions.

BRIEF DESCRIPTION OF THE DRAWINGS

Various embodiments or examples ("examples") are disclosed in the following detailed description and the accompanying drawings:

FIG. 3C illustrates another exemplary functional block diagram for an eye-controlled user interface, according to some examples;

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description to provide a thorough understanding. These details are provided for the purpose of example and the described techniques may be practiced according to the claims without some or all of these specific details.

Figure 1:
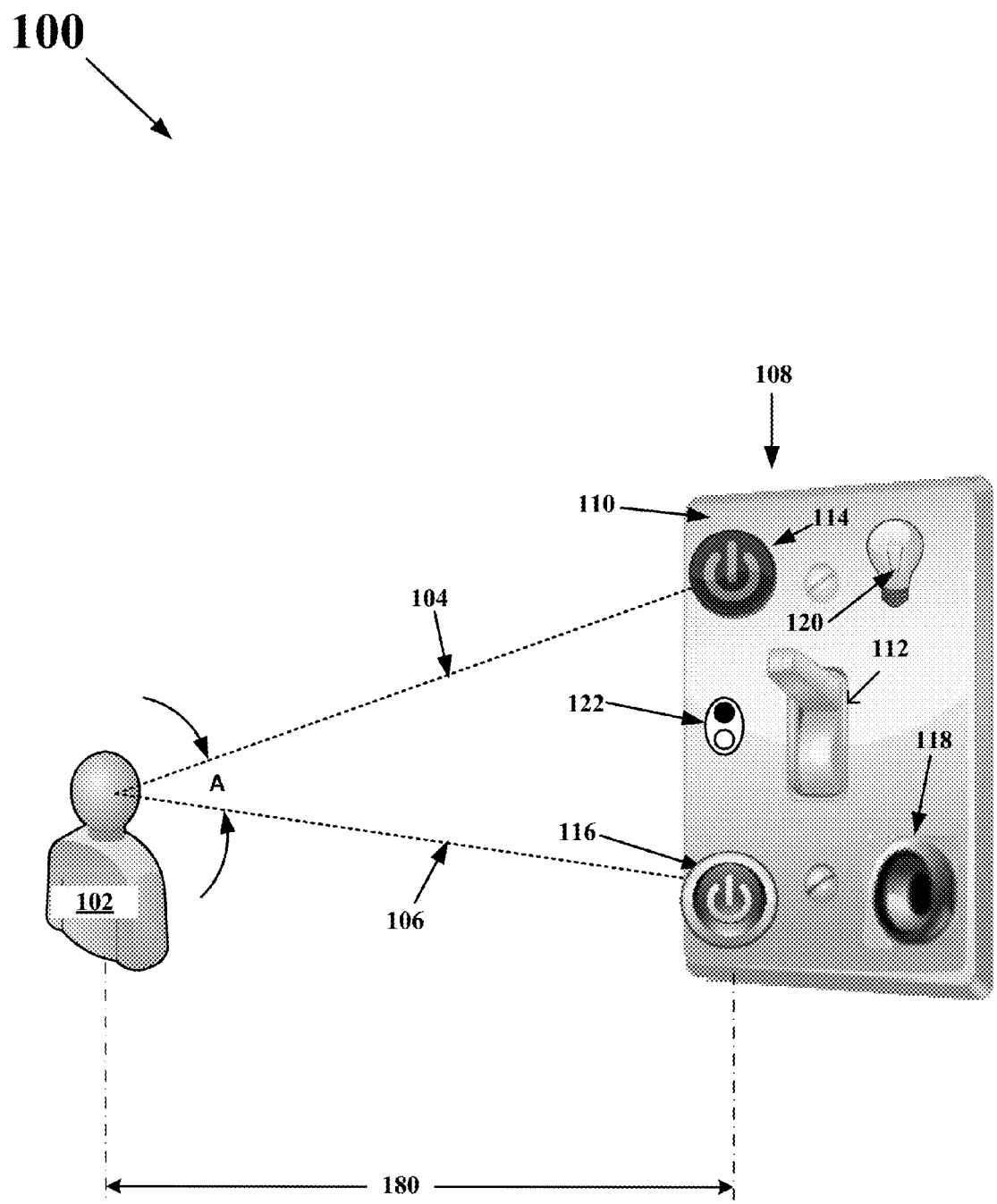
FIG. 1 illustrates an exemplary system embodying an eye-controlled electronic device, according to some examples.

FIG. 1 illustrates an exemplary system embodying an eye-controlled electronic device. Here, diagram 100 includes one or more of user 102, lines-of-sight 104 and 106, eye-controlled user interface 108, faceplate 110, control switch 112, visual feature 114, visual feature 116, image sensor 118, light source 120, and feedback source 122. In some examples, faceplate 110 may be implemented as a substrate, wafer, board (printed, unprinted, or otherwise), or other surface upon which elements 112 to 122 may be mounted, placed, fixed, or otherwise associated thereto. Faceplate 110 may further include a protective or decorative covering made of wood, plastic, or other material, without limitation. The type and configuration of elements may be varied and are not limited to any given type of electrical, electronic, or mechanical component. As such, faceplate 110 and control switch 112 may be omitted.

As an example, elements 114 and 116 may be implemented as any symbol (e.g., implemented as decals), or as sources of light (e.g., light bulbs), or may be printed or painted onto faceplate 110, for example by applying a mixture of pigment suspended in a liquid to the faceplate. Further, image sensor 118 may be implemented as a charge-coupled device ("CCD") image sensor, a complementary metal oxide semiconductor ("CMOS") image sensor, or other image sensor, and is not limited to any specific type of component. In some examples, image sensor 118 may include a lens configured to focus light onto a light-sensitive area. A lens of image sensor 118, in some examples, may be formed or otherwise composed of glass, plastic, or any other organic, natural, or synthetic material. The form of the lens may be configured to be concave, Fresnel, lenticular, or other forms, without limitation. In some examples, the lens may be configured as a combination of multiple lenses. According to some example, image sensor 118 can be configured as an image capture device that is functionally equivalent to a digital camera. One or more source of light may implemented as elements 120 and 122, any of which may be implemented as infrared bulbs (or any infrared light sources, including, but not limited to IR LEDs, etc.), light-emitting diode ("LED"), incandescent bulbs, halogen bulbs, or any other light sources (e.g., at any wavelength or ranges of wavelengths), whether mounted on faceplate 110 or not, and are not limited to any specific type of component. When placed on, or associated with, faceplate 110, elements 112-122 may be fixed using various techniques, including adhesives, mechanical fixing structures (e.g., posts and holes), or others, without limitation.

As shown, diagram 100 provides eye-controlled user interface 108 may be configured to analyze at least one eye of a user to invoke one or commands. For example, eye-controlled user interface 108 may be configured to enable user 102 to direct his or her line of sight 104 toward visual feature 114 to cause a light source (e.g., a room light associated with switch 112) to change to a first state. For example, eye-controlled user interface 108 may be configured to enable or activate switch 112 (i.e., to "turn on") responsive to one or more eye-related characteristics. For example, eye-controlled user interface 108 may be configured to detect a user's eye, perform processing of data related to eye characteristics (as well as other data, such as context and environment), and determine an action based on an intent of the user (e.g., predicted intent based on analysis of the eye characteristics. As such, eye-controlled user interface 108 is configured to facilitate non-physical control of devices, such as a light switch. Similarly, user 102 may direct his or her line of sight 106 toward visual feature 116, whereby eye-controlled user interface 108 may be configured to cause the light source (e.g., the room light associated with switch 112) to change to a second state. For example, eye-controlled user interface 108 may be configured to disable or deactivate switch 112 (i.e., to "turn off").

Image sensor 118 may detect an eye and related eye characteristics of user 102, such as an eye shape, position, orientation, etc., and analyze one or more physical, contextual, or environmental characteristics related to the eye to determine whether eye-controlled user interface 108 ought to cause a control action to be initiated or performed. As an example, if user 102 directs his or her vision toward or substantially toward (e.g., substantially within a line-of-sight) visual feature 114, image sensor 118 may determine that a control action should be performed, namely to turn on the light. According to some examples, light source 120 may provide a light (or degree of illumination) that reflects off a surface and/or from one or more eye structures (e.g., pupil, iris, cornea, lens, sclera, retina, etc.) of user 102's eye to enable image sensor 118 to analyze the reflection to determine an orientation of the eye. In other examples, diagram 100 and the above-described elements may be varied and are not limited to those shown and described.

According to some examples, eye-controlled user interface 108 may be configured to detect eye characteristics at various distances 180 sufficient to differentiate whether user 102 is focusing an eye on either target 114 or target 116 to place operation in either a first or second state, respectively. In a non-limiting example, distance 180 may be 2 cm to 2 m, or greater (e.g., 10 m or more, or any dimension of room). Further, angle A may be at any angle to provide any angular distance between lines of sight 104 and 106. In a non-limiting example, targets 114 and 116 may be disposed a distance from each other such that angle A is 45 degrees or less (e.g., 1 to 5 degrees in some implementations).

Figure 2A:
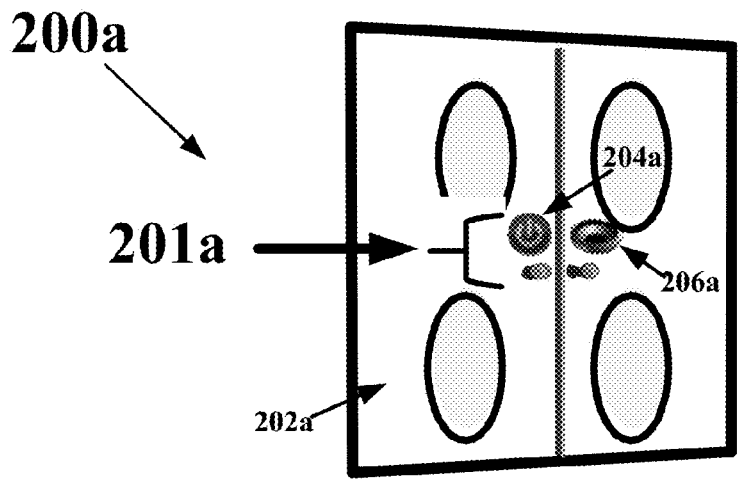
FIG. 2A illustrates an exemplary device with an integrated eye-controlled user interface.

FIG. 2A illustrates an exemplary device with an integrated eye-controlled user interface. Diagram 200a depicts, for example, a door 202a including an eye-controlled user interface 201a, which includes visual feature 204a and image sensor 206a. In some examples, door 202a may be implemented as wood, metal, or other surface upon which elements 204a and 206a may be mounted or otherwise fixed. The type and configuration of elements may be varied and are not limited to any given type of electrical, electronic, or mechanical component. For example, element 204a may be implemented as a decal, or as a light bulb, or may be painted onto door 202a, for example by applying a mixture of pigment suspended in a liquid to door 202a. In some examples, element 204a may be configured to attract a user's eye (e.g., by using a distinctive color or shape) toward a control point, a point at which elements 204a and 206a are substantially proximately disposed to each other. In some examples, attracting a user's eye (e.g., by using a distinctive color or shape) toward visual element 204a may also attract the user's eye toward image sensor 206a. Element 204a may also be implemented as a knob, switch, button, bulb, display, or other feature included on door 202a. Further, element 206a may be implemented as a CCD image sensor, a CMOS image sensor, or other image sensor, image capture device, etc., and is not limited to any specific type of component.

When placed on or in association with door 202a, elements 204a-206a may be fixed using various techniques, including adhesives, mechanical fixing structures (e.g., posts and holes), or others, without limitation.

As shown, eye-controlled user interface 201a is configured to facilitate detection of eye-related characteristics to enable a user to control operation of door 202a by directing his or her vision toward visual feature 204a. In some examples, image sensor 206a is configured to detect an eye (e.g., a state of an eye and its eye-related characteristics, as well as environment characteristics, contextual characteristics, etc.), and to determine whether the detected eye indicates whether to activate the door (i.e. to "lock" or "unlock") or, in other examples, another device. In other examples, eye-controlled user interface 201a and the above-described elements may be varied and are not limited to those shown and described. For example, a second visual feature, a light source, or a feedback source, as described above, may be added, without limitation.

Figure 2B:
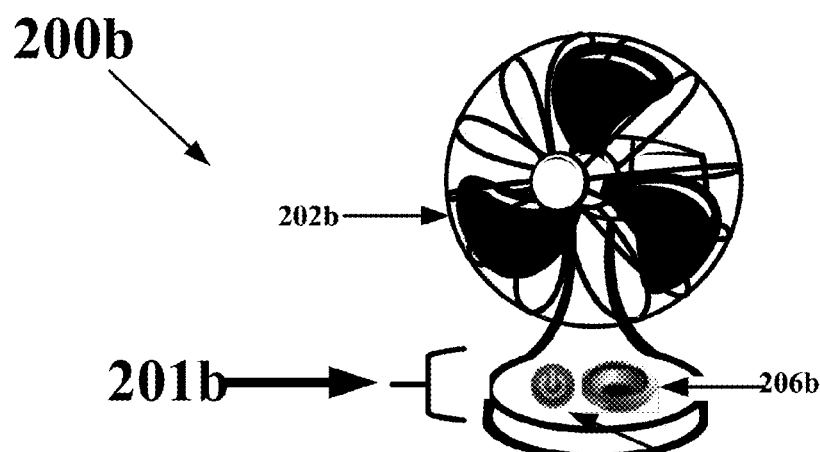
FIG. 2B illustrates another exemplary device with an integrated eye-controlled user interface, according to some examples.

FIG. 2B illustrates another exemplary device with an integrated eye-controlled user interface. Diagram 200b depicts a fan 202b including eye-controlled user interface 201b, which includes visual feature 204b and image sensor 206b. In some examples, fan 202b may include a base area made of plastic, metal, or other surface upon which elements 204b and 206b may be mounted or otherwise fixed. The type and configuration of elements may be varied and are not limited to any given type of electrical, electronic, or mechanical component. For example, element 204b may be implemented as a decal, or as a light source, or may be painted onto fan 202b, for example, by applying a mixture of pigment suspended in a liquid to fan 202b. In some examples, element 204b may be configured to attract a user's eye (e.g., by using a distinctive color or shape) toward a control point, a point at which elements 204b and 206b are substantially proximately disposed to each other. In some examples, attracting a user's eye toward visual feature 204b may also attract the user's eye to align substantially with image sensor 206b. Element 204b may also be implemented as a knob, switch, button, bulb, display, or other feature included on fan 202b. Further, element 206b may be implemented as a CCD image sensor, a CMOS image sensor, or other image sensor, and is not limited to any specific type of component. When placed on or in association with fan 202b, elements 204b-206b may be fixed using various techniques, including adhesives, mechanical fixing structures (e.g., posts and holes), or others, without limitation.

As shown, eye-controlled user interface 201b is configured to facilitate detection of eye-related characteristics to enable a user to control fan 202b by directing his or her vision (e.g., line-of-sight, gaze, etc.) toward visual feature 204b. In some examples, image sensor 206b is configured to detect an eye and/or an eye-related characteristic, and to determine whether the detected state of an eye (e.g., an eye and its eye-related characteristics, as well as environment characteristics, contextual characteristics, etc.) indicates whether to activate the fan (e.g. to "turn on" or "turn off") or, in other examples, another device. In other examples, eye-controlled user interface 201b and the above-described elements may be varied and are not limited to those shown and described. For example, a second visual feature, a light source, or a feedback source, as described above, may be added, without limitation.

Figure 2C:
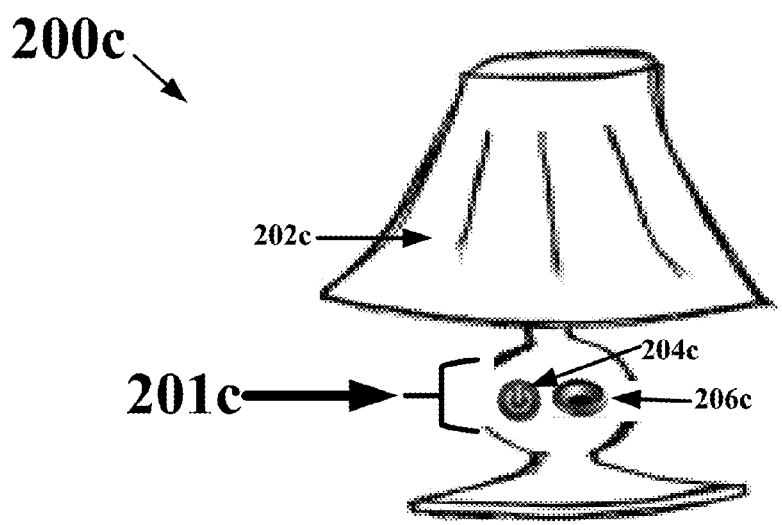
FIG. 2C illustrates another exemplary device with an integrated eye-controlled user interface, according to some examples.

FIG. 2C illustrates another exemplary device with an integrated eye-controlled user interface. Diagram 200c depicts a lamp 202c including eye-controlled user interface 201c, which includes visual feature 204c and image sensor 206c. In some examples, lamp 202c may include a base area implemented as wood, ceramic, metal, or other surface upon which elements 204c and 206c may be mounted or otherwise fixed. The type and configuration of elements may be varied and are not limited to any given type of electrical, electronic, or mechanical component. For example, element 204c may be implemented as a decal, or as a light bulb, or may be painted onto lamp 202c, for example by applying a mixture of pigment suspended in a liquid to lamp 202c. In some examples, element 204c may be configured to attract a user's eye (e.g., by using a distinctive color or shape) toward a control point, a point at which elements 204c and 206c are substantially proximately disposed to each other. In some examples, attracting a user's eye toward visual feature 204c may also attract the user's eye toward image sensor 206c. Element 204c may also be implemented as a knob, switch, button, bulb, display, or other feature included on lamp 202c. Further, element 206c may be implemented as a CCD image sensor, a CMOS image sensor, or other image sensor (e.g., including an image capture device), and is not limited to any specific type of component. When placed on or in association with lamp 202a, elements 204a-206a may be fixed using various techniques, including adhesives, mechanical fixing structures (e.g., posts and holes), or others, without limitation.

As shown, eye-controlled user interface 201c is configured to enable a user to control lamp 202c by directing his or her vision toward visual feature 204c. In some examples, image sensor 206c is configured to detect an eye, and to determine whether the detected eye indicates whether to activate a lamp (e.g. to "turn on" or "turn off") or, in other examples, another device. In other examples, eye-controlled user interface 201c and the above-described elements may be varied and are not limited to those shown and described. For example, a second visual feature, a light source, or a feedback source, as described above, may be added, without limitation.

Figure 2D:
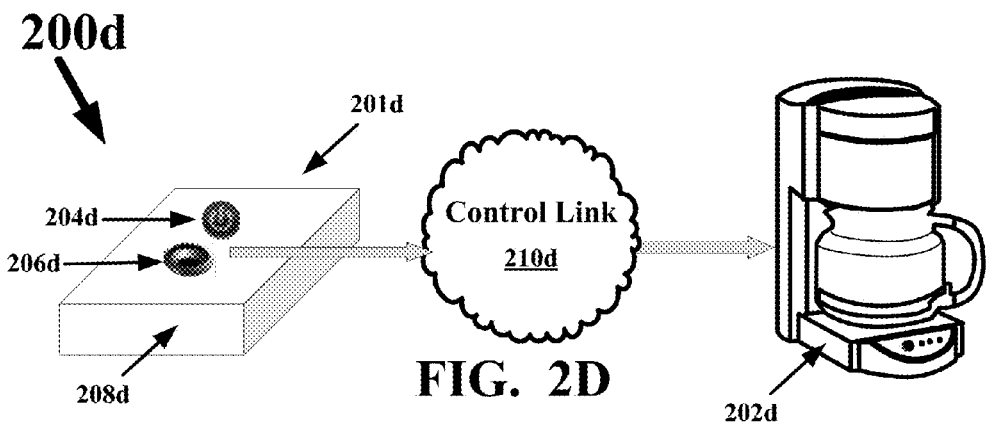
FIG. 2D illustrates an exemplary freestanding eye-controlled user interface coupled to an electronic device, according to some examples.

FIG. 2D illustrates an exemplary freestanding eye-controlled user interface coupled to an electronic device. Diagram 200d depicts an eye-controlled user interface 201d, which includes, or is otherwise associated with, visual feature 204d, image sensor 206d, and housing 208d, any of which is configured to communicate via control link transceiver 210d to control coffee maker 202d. In some examples, coffee maker 202d may support remote control capability by providing an infrared ("IR") port (not shown), or another communication transceiver. The type and configuration of elements may be varied and are not limited to any given type of electrical, electronic, or mechanical component. For example, element 204d may be implemented as a decal, or as a light bulb, or may be painted onto coffee maker 202d, for example by applying a mixture of pigment suspended in a liquid to coffee maker 202d. In some examples, element 204d may be configured to attract a user's eye (e.g., by using a distinctive color or shape or other symbolic means to indicate an action that a user may wish to effectuate) toward a control point, a point at which elements 204d and 206d are substantially proximately disposed to each other. In some examples, attracting a user's eye toward visual feature 204d may also attract the user's eye toward image sensor 206d. Element 204d may also be implemented as a knob, switch, button, bulb, display, or other feature included on coffee maker 202d. Further, element 206d may be implemented as a CCD image sensor, a CMOS image sensor, or other image sensor, and is not limited to any specific type of component. Further, housing 208d may be implemented using plastic, metal, wood, or other surface upon which elements 204d and 206*d* may be mounted or otherwise fixed. When placed onto or in association with housing 208*d*, elements 204*d*-206*d* may be affixed using various techniques, including adhesives, mechanical fixing structures (e.g., posts and holes), or others, or otherwise related thereto without limitation. Further, control link 210*d* may be implemented as an audible connection, a digital wireless connection, an analog wireless connection (e.g. Bluetooth or IEEE 802.11), a radio frequency connection, a wired or wireless network connection, a cellular network connection, an infrared connection, or other interface that supports exchange of control data between eye-controlled user interface 201*d* and coffee maker 202*d* (or another electrical or electronic device).

As shown, eye-controlled user interface 201*d* may be configured to enable a user to control coffee maker 202*d* by directing his or her vision toward visual feature 204*d*. In some examples, image sensor 206*d* is configured to detect an eye, and to determine whether the detected eye indicates whether to activate the coffee maker (i.e. to "start" or "stop") or, in other examples, another device. In addition to supporting visual feature 204*d* and image sensor 206*d*, housing 208*d*, in some examples, is configured to be placed in, on, or in association with, coffee maker 202*d*, near other appliances, or to be carried by a user. Also as shown, control link transceiver 210*d* enables eye-controlled user interface 200*d* to integrate with any appliance or device providing a control interface. In other examples, eye-controlled user interface 200*d* and the above-described elements may be varied and are not limited to those shown and described. For example, a second visual feature, a light source, or a feedback source, as described above, may be added, without limitation.

Figure 2E:
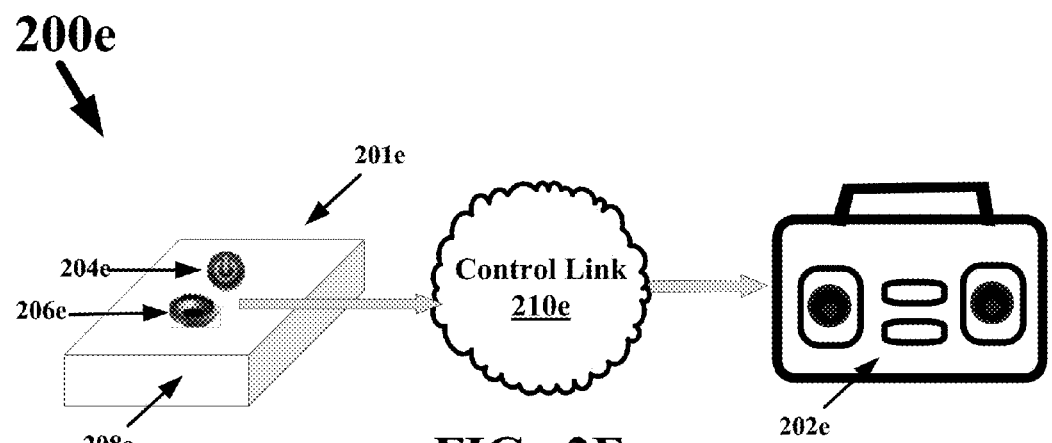
FIG. 2E illustrates another exemplary freestanding eye-controlled user interface coupled to an electronic device, according to some examples.

FIG. 2E illustrates another exemplary freestanding eye-controlled user interface coupled to an electronic device. Diagram 200*e* depicts an eye-controlled user interface 201*e*, which includes visual feature 204*e*, image sensor 206*e*, and housing 208*e*, any of which may be configured to communicate via control link transceiver 210 to stereo 202*e* (or any other audio device). In some examples, audio device 202*e* may support remote control capability by providing an infrared ("IR") port or any other communication transceiver and/or protocol. The type and configuration of elements may be varied and are not limited to any given type of electrical, electronic, or mechanical component. For example, element 204*e* may be implemented as a decal, or as a light bulb, or may be painted onto stereo 202*e*, for example by applying a mixture of pigment suspended in a liquid to audio device 202*e*. In some examples, element 204*e* may be configured to attract a user's eye (e.g., by using a distinctive color or shape) toward a control point, a point at which elements 204*e* and 206*e* are substantially proximately disposed to each other. In some examples, attracting a user's eye toward visual feature 204*e* may also attract the user's eye toward image sensor 206*e*. Element 204*e* may also be implemented as a knob, switch, button, bulb, display, or other feature included on audio device 202*e*. Further, element 206*e* may be implemented as a CCD image sensor, a CMOS image sensor, or other image sensor, and is not limited to any specific type of component. Further, housing 208*e* may be implemented using plastic, metal, wood, or other surface upon which elements 204*e* and 206*e* may be mounted or otherwise fixed. When placed onto or in association with housing 208*e*, elements 204*e*-206*e* may be fixed using various techniques, including adhesives, mechanical fixing structures (e.g., posts and holes), or others, without limitation. Further, control link transceiver 210*e* may be implemented as an audible connection, a digital wireless connection, an analog wireless connection (e.g. Bluetooth or IEEE 802.11), a radio frequency connection, a wired or wireless network connection, a cellular network connection, an infrared connection, or other interface that supports exchange of control data between eye-controlled user interface 201*e* and audio device 202*e* (or another electrical or electronic device).

As shown, eye-controlled user interface 201*e* is configured to enable a user to control stereo 202*e* by directing his or her vision toward visual feature 204*e*. In some examples, image sensor 206*e* is configured to detect an eye, and to determine whether the detected eye indicates whether to activate a stereo (i.e. to "turn on" or "turn off") or, in other examples, another device. In addition to supporting visual feature 204*e* and image sensor 206*e*, housing 208*e*, in some examples, is configured to be placed in, near, or in association with audio device 202*e*, near other stereophonic equipment, or to be carried by a user. Also as shown, control link transceiver 210*e* enables eye-controlled user interface 201*e* to integrate with any audio or video system providing a control interface. In other examples, eye-controlled user interface 201*e* and the above-described elements may be varied and are not limited to those shown and described. For example, a second visual feature, a light source, or a feedback source, as described above, may be added, without limitation.

Figure 2F:
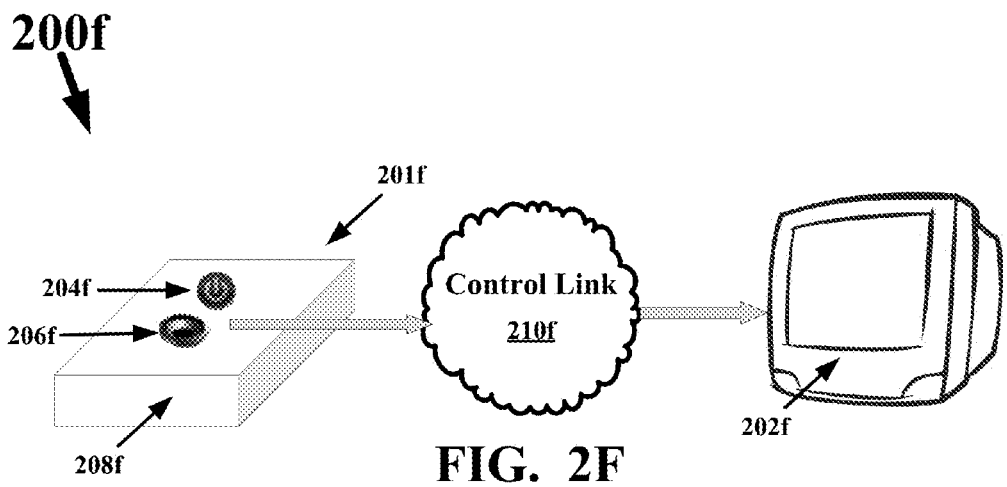
FIG. 2F illustrates another exemplary freestanding eye-controlled user interface coupled to an electronic device, according to some examples.

FIG. 2F illustrates another exemplary freestanding eye-controlled user interface coupled to an electronic device. Diagram 200*f* depicts an eye-controlled user interface 201*f*, which includes, visual feature 204*f*, image sensor 206*f*, and housing 208*f*, any of which may be configured to communicate via control link transceiver 210*f* to control television 202*f*. In some examples, television 202*f* may support remote control capability by providing an infrared ("IR") port or the like. The type and configuration of elements may be varied and are not limited to any given type of electrical, electronic, or mechanical component. For example, element 204*f* may be implemented as a decal, or as a light bulb, or may be painted onto television 202*f*, for example by applying a mixture of pigment suspended in a liquid to television 202*f*. In some examples, element 204*f* may be configured to attract a user's eye (e.g., by using a distinctive color or shape) toward a control point, a point at which elements 204*f* and 206*f* are substantially proximately disposed to each other. In some examples, attracting a user's eye toward visual feature 204*f* may also attract the user's eye toward image sensor 206*f*. Further, element 206*f* may be implemented as a CCD image sensor, a CMOS image sensor, or other image sensor, and is not limited to any specific type of component. Further, housing 208*f* may be implemented using plastic, metal, wood, or other surface upon which elements 204*f* and 206*f* may be mounted or otherwise fixed. When placed onto or in association with housing 208*f*, elements 204*f*-206*f* may be fixed using various techniques, including adhesives, mechanical fixing structures (e.g., posts and holes), or others, without limitation. Further, control link transceiver 210*f* may be implemented as an audible connection, a digital wireless connection, an analog wireless connection (e.g. Bluetooth or IEEE 802.11), a radio frequency connection, a wired or wireless network connection, a cellular network connection, an infrared connection, or other interface that supports exchange of control data between eye-controlled user interface 201*f* and television 202*f* (or another electrical or electronic device).

As shown, eye-controlled user interface 201*f* is configured to enable a user to control television 202*f* by directing his or her vision toward visual feature 204*f*. In some examples, image sensor 206*f* is configured to detect an eye, and to determine whether the detected eye indicates whether to activate television 202f (i.e. to "turn on" or "turn off") or, in other examples, another device. In addition to supporting visual feature 204f and image sensor 206f, housing 208f, in some examples, is configured to be placed in, on, near, or in association with television 202f, near other video equipment, or to be carried by a user. Also as shown, control link transceiver 210f enables eye-controlled user interface 201f to integrate with any video equipment providing a control interface. In other examples, eye-controlled user interface 201f and the above-described elements may be varied and are not limited to those shown and described. For example, a second visual feature, a light source, or a feedback source, as described above, may be added, without limitation.

Figure 3A:
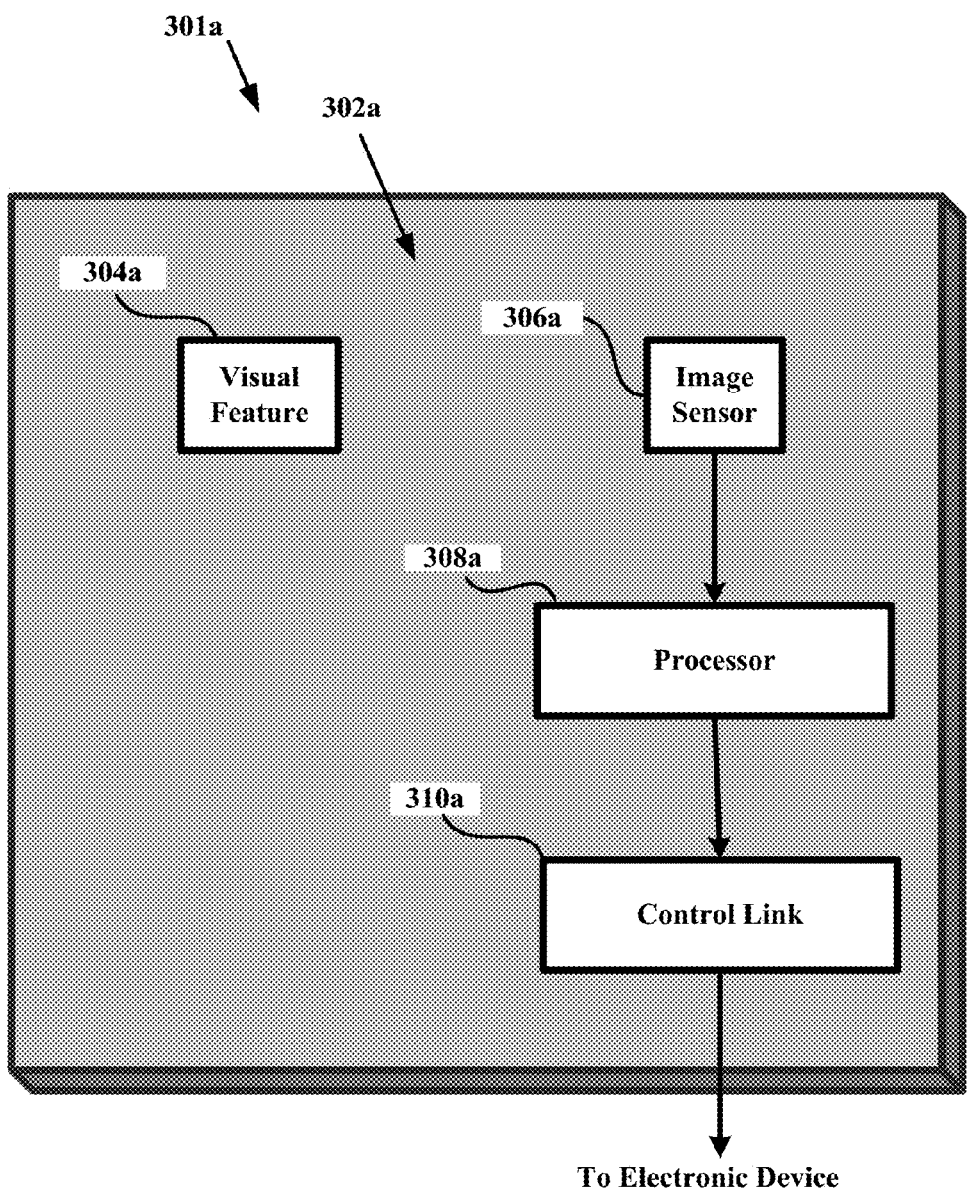
FIG. 3A illustrates an exemplary functional block diagram for an eye-controlled user interface, according to some examples.

FIG. 3A illustrates an exemplary functional block diagram for an eye-controlled user interface. Diagram 300a depicts an eye-controlled user interface 301a includes substrate 302a, visual feature 304a, image sensor 306a, processor 308a, and control link transceiver 310a. In some examples, substrate 302a may be implemented as a substrate, wafer, board (printed, unprinted, or otherwise), or other surface upon which elements 304a-310a may be mounted, placed, or otherwise fixed. Substrate 302a may further include a protective or decorative covering made of wood, plastic, or other material, without limitation. Substrate 302a may further be embedded in or integrated with another device, using structural and/or functional integration to enable image sensor 306a to receive images, and enabling visual feature 304a to be visible or substituting another visible object for visual feature 304a. The type and configuration of elements may be varied and are not limited to any given type of electrical, electronic, or mechanical component. For example, visual feature 304a may be implemented as a decal, or as a light sources, or may be painted onto a surface, for example by applying a mixture of pigment suspended in a liquid to the surface. Further, visual feature 304a may correspond to a switch, button, bulb, display, or other feature of an electronic device. Further, image sensor 306a may be implemented as a CCD image sensor, a CMOS image sensor, a camera or other image sensor, and is not limited to any specific type of component. Further, processor 308a may be implemented as a microprocessor, a field-programmable gate array ("FPGA"), a digital signal processor ("DSP") an application-specific integrated circuit ("ASIC"), or any other type of integrated circuit configured to execute computer instructions. Further, processor 308a may use external computing resources to perform some, none, or all of the instructions. As a further example, control link transceiver 310a may be implemented as an audible connection, a digital wireless connection (e.g. Bluetooth or IEEE 802.11), an analog wireless connection, a radio frequency connection, a wired or wireless network connection, a cellular network connection, an infrared connection, or other interface that supports exchange of control data between eye-controlled user interface 300a and an electronic device. When placed on substrate 302a, elements 304a-310a may be fixed using various techniques, including adhesives, mechanical fixing structures (e.g., posts and holes), or others, without limitation.

As shown, eye-controlled user interface 301a is configured to enable a user to direct his or her vision toward visual feature 304a to control an electronic device. Here, image sensor 306a may detect a user's eye shape/position, and analyze one or more physical characteristics of the eye to determine whether a control action should be initiated or performed. As an example, if a user directs his or her vision toward visual feature 304a, image sensor 306a, together with processor 308a, may determine that a control action should be performed. In other examples, eye-controlled user interface 301a and the above-described elements may be varied and are not limited to those shown and described.

Figure 3B:
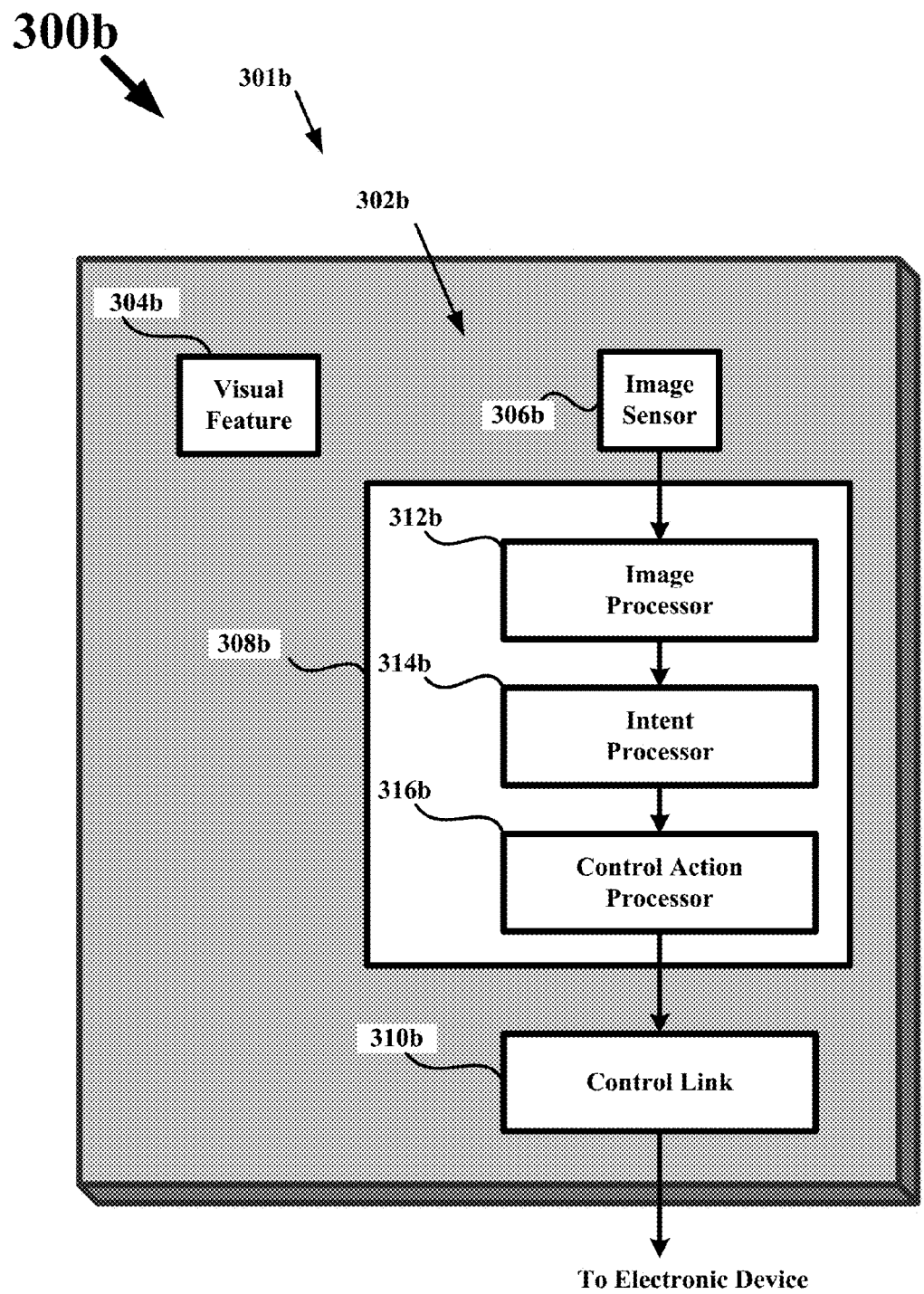
FIG. 3B illustrates another exemplary functional block diagram for an eye-controlled user interface, according to some examples.

FIG. 3B illustrates another exemplary functional block diagram for an eye-controlled user interface. Diagram 300b depicts an example of an eye-controlled user interface 301b includes substrate 302b, visual feature 304b, image sensor 306b, processor 308b, which includes image processor 312b, intent processor 314b, and control action processor 316b, and control link transceiver 310b. In some examples, substrate 302b may be implemented as a substrate, wafer, board (printed, unprinted, or otherwise), or other surface upon which elements 304b-316b may be mounted, placed, or otherwise fixed. Substrate 302b may further include a protective or decorative covering made of wood, plastic, or other material, without limitation. Substrate 302b may further be embedded in or integrated with another device, using structural and/or functional integration to enable image sensor 306b to receive images, and enabling visual feature 304b to be visible or substituting another visible object for visual feature 304b. The type and configuration of elements may be varied and are not limited to any given type of electrical, electronic, or mechanical component. For example, visual feature 304b may be implemented as a decal, or as a light sources, or may be painted onto a surface, for example by applying a mixture of pigment suspended in a liquid to the surface. Further, visual feature 304b may correspond to a switch, button, bulb, display, or other feature integrated with or displayed on or by an electronic device. Further, image sensor 306b may be implemented as a CCD image sensor, a CMOS image sensor, a camera or other image sensor, and is not limited to any specific type of component. Further, processor 308b may be implemented as a microprocessor, a field-programmable gate array ("FPGA"), a digital signal processor ("DSP") an application-specific integrated circuit ("ASIC"), or any other type of integrated circuit configured to execute computer instructions. Further, processor 308b may use external computing resources to perform instructions. Here, processor 308b is shown to include image processor 312b, intent processor 314b, and control action processor 316b. Processors 312b-314b may be implemented as separate processors, or may be implemented as different sets of instructions to be performed on a single processor, or one or more of processors 312b, 314b, and 316b may be configured to utilize external computing resources, such as a host computer's processor or a mobile device processor. As a further example, control link transceiver 310b may be implemented as an audible connection, a digital wireless connection (e.g. Bluetooth or IEEE 802.11), an analog wireless connection, a radio frequency connection, a wired or wireless network connection, a cellular network connection, an infrared connection, or other interface that supports exchange of control data between eye-controlled user interface 301b and an electronic device. When placed on substrate 302b, elements 304b-316b may be fixed using various techniques, including adhesives, mechanical fixing structures (e.g., posts and holes), or others, without limitation.

As shown, eye-controlled user interface 301b is configured to enable a user to direct his or her vision toward visual feature 304b to control an electronic device. Here, image sensor 306b may detect a user's eye shape/position, and analyze one or more physical characteristics of the eye to determine whether a control action should be initiated or performed. As an example, if a user directs his or her vision toward visual feature 304b, image sensor 306b, together with processor 308b, may determine that a control action should be performed. In other examples, eye-controlled user interface 301b and the above-described elements may be varied and are not limited to those shown and described.

FIG. 3C illustrates another exemplary functional block diagram for an eye-controlled user interface. Diagram 300c depicts an eye-controlled user interface 301c includes visual feature 304c, image sensor 306c, processor 308c, control link transceiver 310c, and another visual feature 318c. In some examples, substrate 302c may be implemented as a substrate, wafer, board (printed, unprinted, or otherwise), or other surface upon which elements 304c-318c may be mounted, placed, or otherwise fixed. Substrate 302c may further include a protective or decorative covering made of wood, plastic, or other material, without limitation. Substrate 302c may further be embedded in or integrated with another device, using structural and/or functional integration to enable image sensor 306c to receive images, and enabling visual features 304c and 318c to be visible or substituting other visible objects for visual features 304c and 318c. The type and configuration of elements may be varied and are not limited to any given type of electrical, electronic, or mechanical component. For example, visual features 304c and 318c may be implemented as a decal, or as a light bulb, or may be painted onto a surface, for example by applying a mixture of pigment suspended in a liquid to the surface. Further, visual features 304c and 318c may correspond to a switch, button, bulb, display, or other feature integrated with or displayed on or by an electronic device. Further, image sensor 306c may be implemented as a CCD image sensor, a CMOS image sensor, a camera or other image sensor, and is not limited to any specific type of component. Further, processor 308c may be implemented as a microprocessor, a field-programmable gate array ("FPGA"), a digital signal processor ("DSP") an application-specific integrated circuit ("ASIC"), or any other type of integrated circuit configured to execute computer instructions. Further, processor 308c may use external computing resources to perform some, none, or all of the instructions. As a further example, control link transceiver 310c may be implemented as an audible connection, a digital wireless connection (e.g. Bluetooth or IEEE 802.11), an analog wireless connection, a radio frequency connection, a wired or wireless network connection, a cellular network connection, an infrared connection, or other interface that supports exchange of control data between eye-controlled user interface 301c and an electronic device. When placed on substrate 302c, elements 304c-318c may be fixed using various techniques, including adhesives, mechanical fixing structures (e.g., posts and holes), or others, without limitation.

As shown, eye-controlled user interface 301c is configured to enable a user to direct his or her vision toward visual feature 304c or 318c to control an electronic device. Here, image sensor 306c may detect a user's eye shape/position, and may facilitate analysis of one or more eye characteristics (e.g., physical characteristics) of the eye to determine whether a control action should be initiated or performed. As an example, if a user directs his or her vision toward visual feature 304c, image sensor 306c, together with processor 308c, may determine that a control action should be performed. In another example, if a user directs his or her vision toward visual feature 318, image sensor 306c, together with processor 308c, may determine that a control action should be performed. In other examples, eye-controlled user interface 301c and the above-described elements may be varied and are not limited to those shown and described.

Figure 3D:
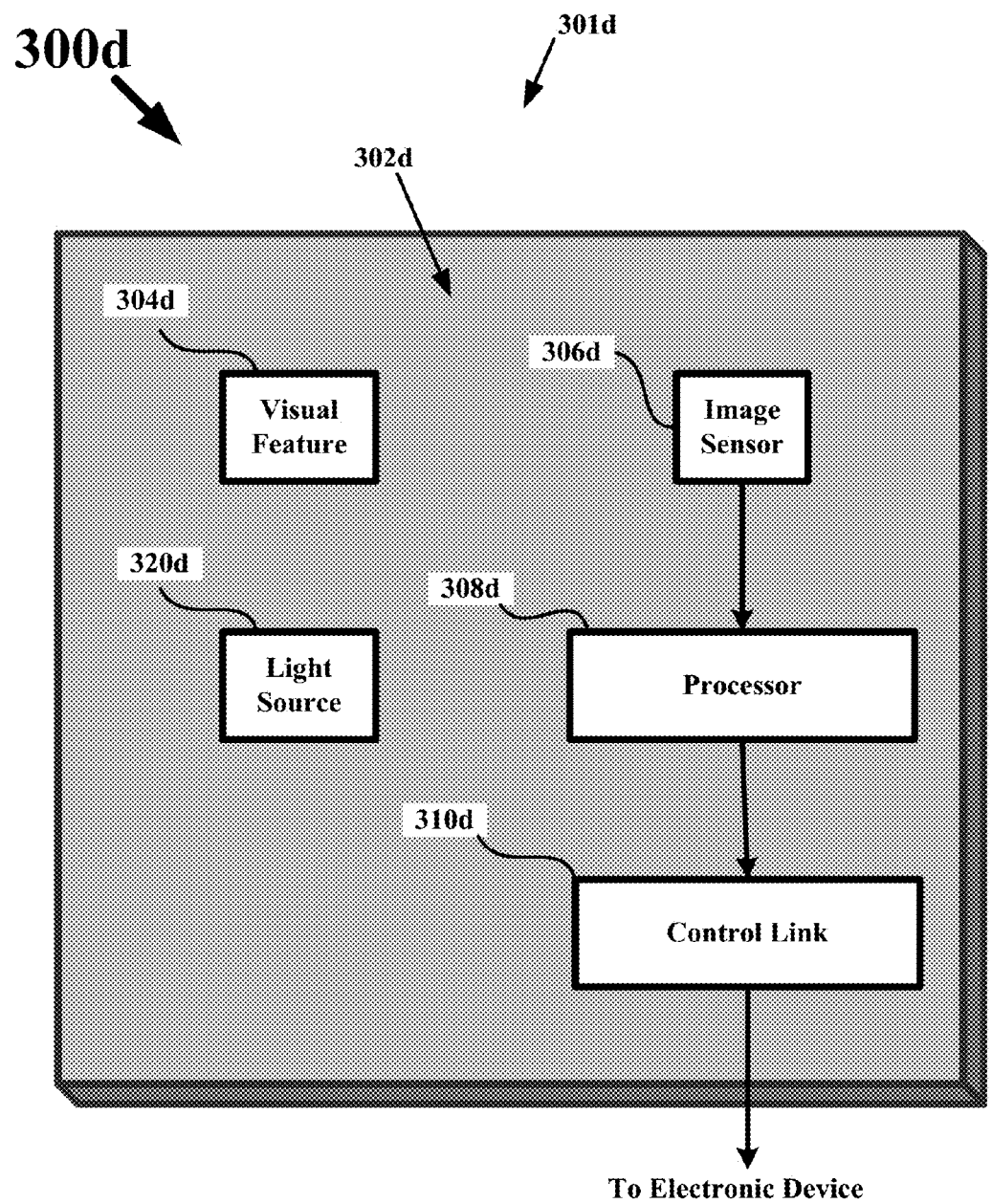
FIG. 3D illustrates another exemplary functional block diagram for an eye-controlled user interface, according to some examples.

FIG. 3D illustrates another exemplary functional block diagram for an eye-controlled user interface. Diagram 300d depicts an eye-controlled user interface 301d including visual feature 304d, image sensor 306d, processor 308d, control link transceiver 310d, and light source 320d. In some examples, substrate 302d may be implemented as a substrate, wafer, board (printed, unprinted, or otherwise), or other surface upon which elements 304d-320d may be mounted, placed, or otherwise fixed. Substrate 302d may further include a protective or decorative covering made of wood, plastic, or other material, without limitation. Substrate 302d may further be embedded in or integrated with another device, using structural and/or functional integration to enable image sensor 306d to receive images, and enabling visual feature 304d to be visible or substituting another visible object for visual feature 304d. The type and configuration of elements may be varied and are not limited to any given type of electrical, electronic, or mechanical component. For example, visual feature 304d may be implemented as a decal, or as a light bulb, or may be painted onto a surface, for example by applying a mixture of pigment suspended in a liquid to the surface. Further, visual feature 304d may correspond to a switch, button, bulb, display, or other feature integrated with or displayed on or by an electronic device. Further, image sensor 306d may be implemented as a CCD image sensor, a CMOS image sensor, a camera or other image sensor, and is not limited to any specific type of component. Further, processor 308d may be implemented as a microprocessor, a field-programmable gate array ("FPGA"), a digital signal processor ("DSP") an application-specific integrated circuit ("ASIC"), or any other type of integrated circuit configured to execute computer instructions. Further, processor 308d may use external computing resources to perform some, none, or all of the instructions. As a further example, control link transceiver 310d may be implemented as an audible connection, a digital wireless connection (e.g. Bluetooth or IEEE 802.11), an analog wireless connection, a radio frequency connection, a wired or wireless network connection, a cellular network connection, an infrared connection, or other interface that supports exchange of control data between eye-controlled user interface 301d and an electronic device. As a further example, light source 320d may be implemented as an infrared bulb, a light-emitting diode ("LED") bulb, or other light sources, whether mounted on substrate 302d or not, and is not limited to any specific type of component. When placed on substrate 302d, elements 304d-318d may be fixed using various techniques, including adhesives, mechanical fixing structures (e.g., posts and holes), or others, without limitation.

As shown, eye-controlled user interface 301d is configured to enable a user to direct his or her vision toward visual feature 304d to control an electronic device. Here, light source 320d may provide a light that reflects off a surface or an eye structure of a user's eye to enable image sensor 306d, together with processor 308, to analyze the reflection to determine the eye's state (e.g., an eye orientation). In other examples, eye-controlled user interface 301d and the above-described elements may be varied and are not limited to those shown and described.

Figure 3E:
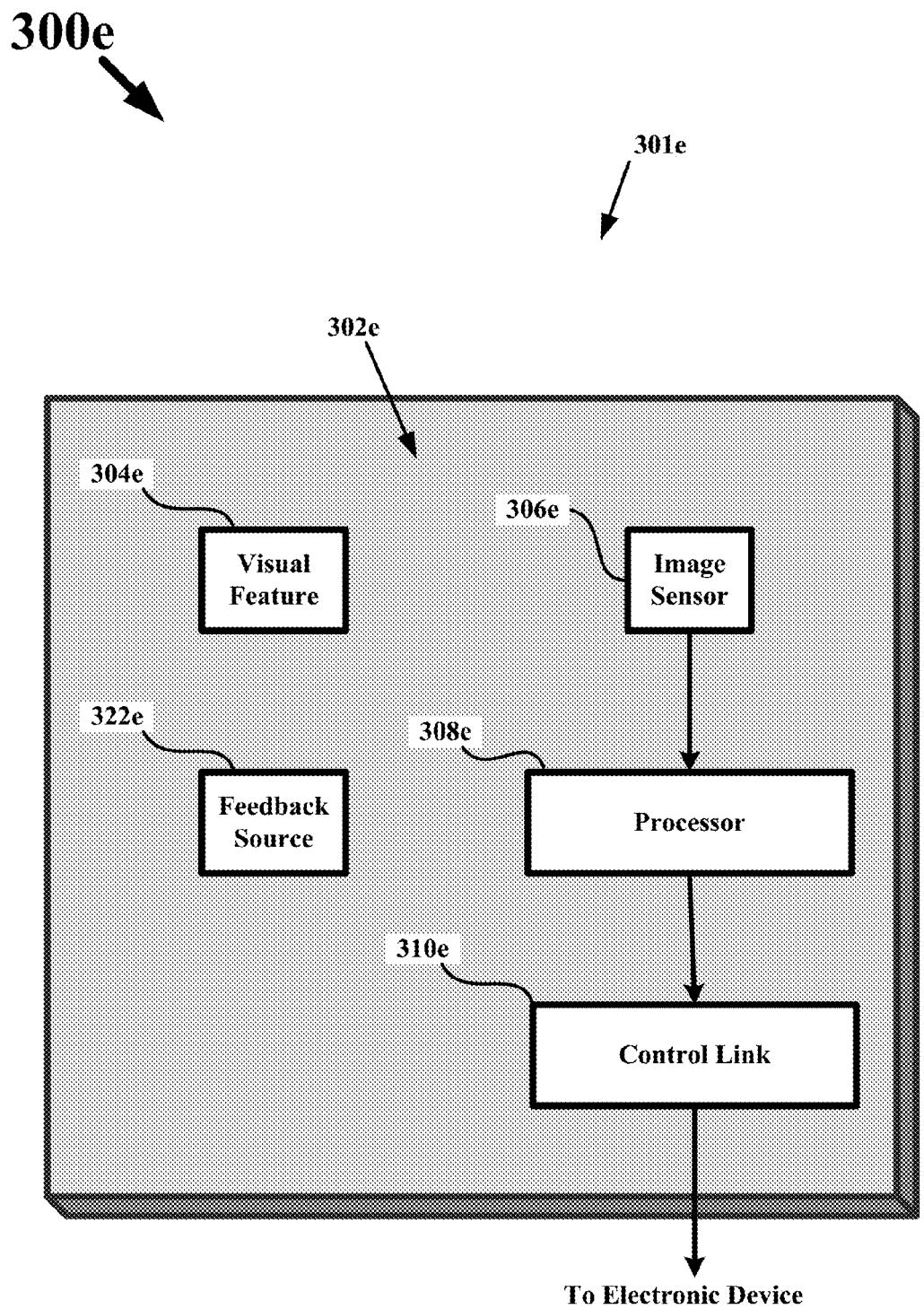
FIG. 3E illustrates another exemplary functional block diagram for an eye-controlled user interface, according to some examples.

FIG. 3E illustrates another exemplary functional block diagram for an eye-controlled user interface. Diagram 300e depicts an example of an eye-controlled user interface 301e including visual feature 304e, image sensor 306e, processor 308e, control link transceiver 310e, and a feedback source 322e. In some examples, substrate 302e may be implemented as a substrate, wafer, board (printed, unprinted, or otherwise), or other surface upon which elements 304e-322e may be mounted, placed, or otherwise fixed. Substrate 302e may further include a protective or decorative covering made of wood, plastic, or other material, without limitation. Substrate 302e may further be embedded in or integrated with another device, using structural and/or functional integration to enable image sensor 306e to receive images, and enabling visual feature 304e to be visible or substituting another visible object for visual feature 304e. The type and configuration of elements may be varied and are not limited to any given type of electrical, electronic, or mechanical component. For example, visual feature 304e may be implemented as a decal, or as a light source, or may be painted onto a surface, for example by applying a mixture of pigment suspended in a liquid to the surface. Further, visual feature 304e may correspond to a switch, button, bulb, display, or other feature integrated with or displayed on or by an electronic device. Further, image sensor 306e may be implemented as a CCD image sensor, a CMOS image sensor, a camera or other image sensor, and is not limited to any specific type of component. Further, processor 308e may be implemented as a microprocessor, a field-programmable gate array ("FPGA"), a digital signal processor ("DSP") an application-specific integrated circuit ("ASIC"), or any other type of integrated circuit configured to execute computer instructions. Further, processor 308e may use external computing resources to perform some, none, or all of the instructions. As a further example, control link transceiver 310e may be implemented as an audible connection, a digital wireless connection (e.g. Bluetooth or IEEE 802.11), an analog wireless connection, a radio frequency connection, a wired or wireless network connection, a cellular network connection, an infrared connection, or other interface that supports exchange of control data between eye-controlled user interface 301e and an electronic device. Further, feedback source 322e may be implemented as an audio source, such as a tone generator, or as a visual source, such as a light bulb, as one or more light-emitting diode ("LEDs"), a liquid crystal display ("LCD") or other display capable of displaying a representation of a control action. When placed on or in association with substrate 302e, elements 304e-322e may be fixed using various techniques, including adhesives, mechanical fixing structures (e.g., posts and holes), or others, without limitation.

As shown, eye-controlled user interface 301e is configured to enable a user to direct his or her vision toward visual feature 304e to control an electronic device. Here, image sensor 306e may detect a user's eye shape/position, and analyze one or more physical characteristics of the eye to determine whether a control action should be initiated or performed. As an example, if a user directs his or her vision toward visual feature 304e, image sensor 306e, together with processor 308e, may determine that a control action should be performed and to derive a control action. In such an example, feedback source 322e may be configured to provide a notification representative of the derived control action, enabling the user to confirm, reject, modify, or otherwise react to the derived control action. In other examples, eye-controlled user interface 301e and the above-described elements may be varied and are not limited to those shown and described.

Figure 4A:
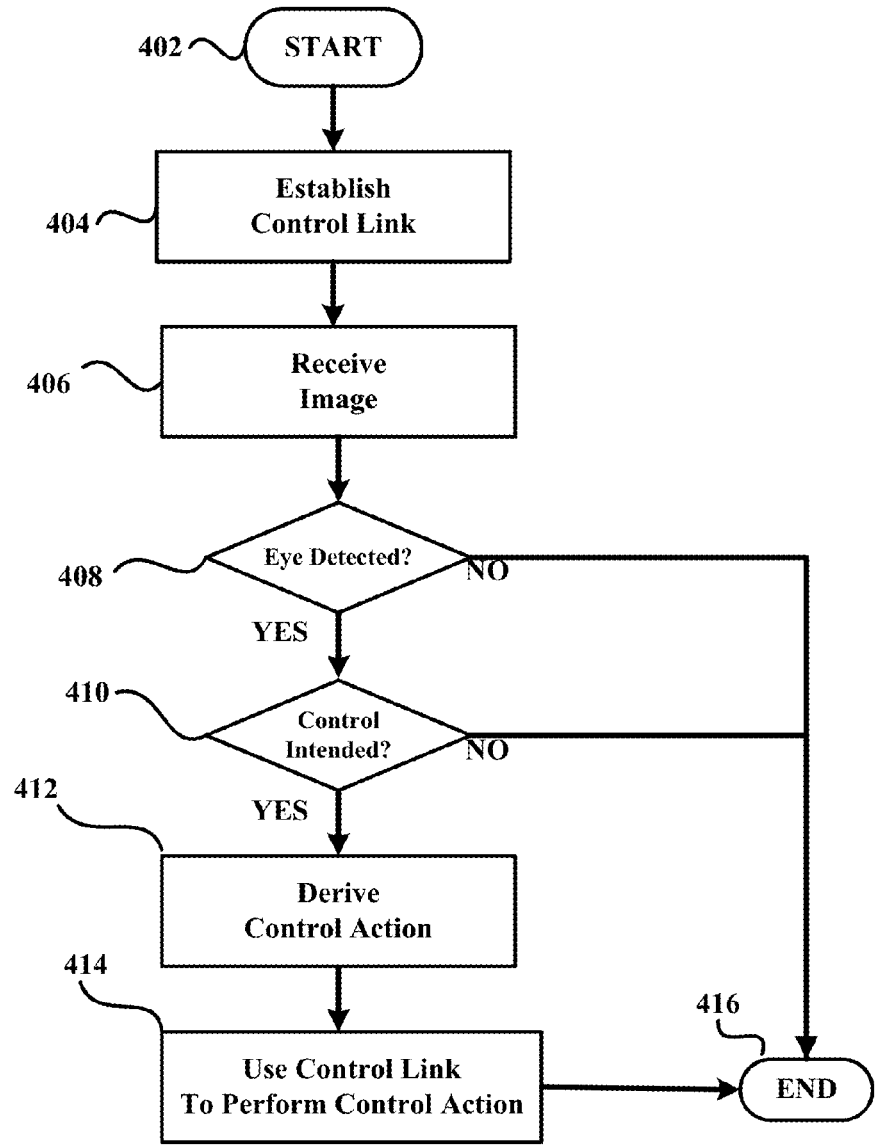
FIG. 4A illustrates an example of a flow for controlling an electronic device by an eye-controlled user interface, according to some examples.

FIG. 4A illustrates an example of a flow for controlling an electronic device by an eye-controlled user interface according to various embodiments. In some examples, eye-controlled user interface can detect and/or characterize a user's eye, determine that the user intends to perform a control action, and derive and perform the control action. As shown, flow 400a starts at 402 and includes establishing a communications link (e.g., a control link) using a control link transceiver at 404, which is further described below and with reference to FIG. 5. Flow 400a can further include receiving an image at 406, evaluating whether an eye is detected at 408. In some cases, if eye characteristics are detected, flow 400a includes evaluating whether a control is intended at 410. If control is intended, flow 400a includes deriving a control action at 412. In some examples, a user may direct his or her gaze toward eye-controlled user interface for greater than a threshold period of time, indicating that the state of the electronic device should be toggled from on to off, or visa versa. Further examples of detecting a user's eye and determining what, if any, control actions should be performed are described herein, and, for example, with reference to FIGS. 6 to 8, among others. Flow 400a may further include using a control link transceiver to perform the control action at 414, and ending at 416. If an eye is not detected at 408, or if it is determined that a control action is not intended at 410, flow 400 may end at 422.

Figure 4B:
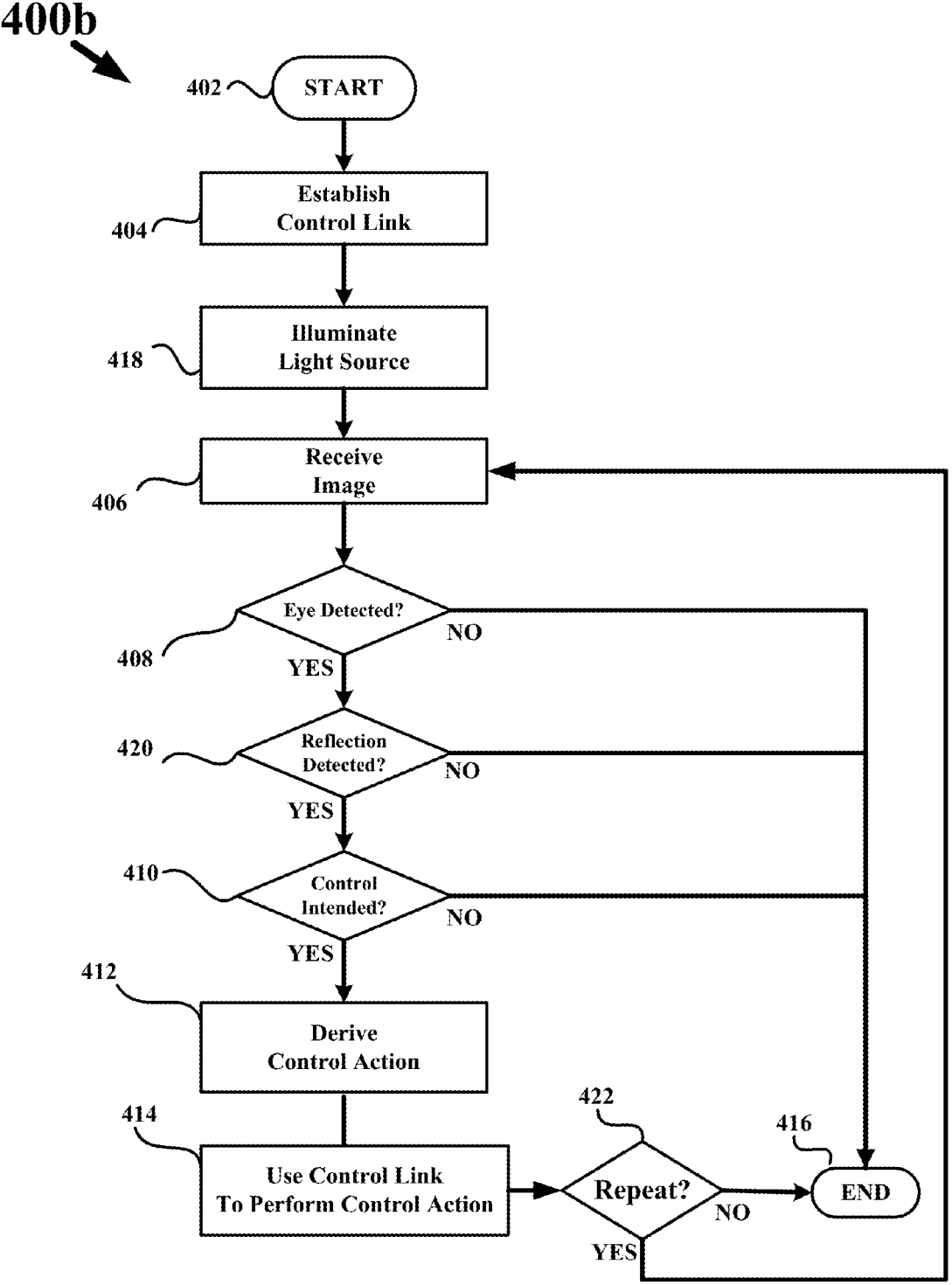
FIG. 4B illustrates another an example of a flow for controlling an electronic device by an eye-controlled user interface, according to some examples.

FIG. 4B illustrates another example of a flow for controlling an electronic device by an eye-controlled user interface according to various embodiments. As shown, flow 400b includes establishing a control link at 404, which is further described herein, and, for example, with reference to FIG. 5. Flow 400a can further include causing a light source to illuminate at 418. An image is received at 406, and flow 400b evaluates whether an eye is detected at 408. If an eye is detected, flow 400b includes determining whether a reflection of the light source is detected at 420. At 410, a determination is made to evaluate whether a control is intended at 410. If control is intended, flow 400b derives a control action at 412. In some examples, a user may direct his or her gaze toward an eye-controlled user interface for greater than a threshold period of time, indicating that the state of the electronic device should be toggled from on to off, or visa versa. Further examples of detecting a user's eye and determining what, if any, control actions should be performed are described below and with reference to FIGS. 6 to 8, among others. Flow 400b may further include using the control link transceiver to perform the control action at 414 and to check whether to repeat the flow at 420. Otherwise, flow 400b ends at 416. If an eye is not detected at 408, a reflection is not detected at 420. Further, if it is determined that a control action is not intended at 410, flow 400b may end at 422.

Figure 4C:
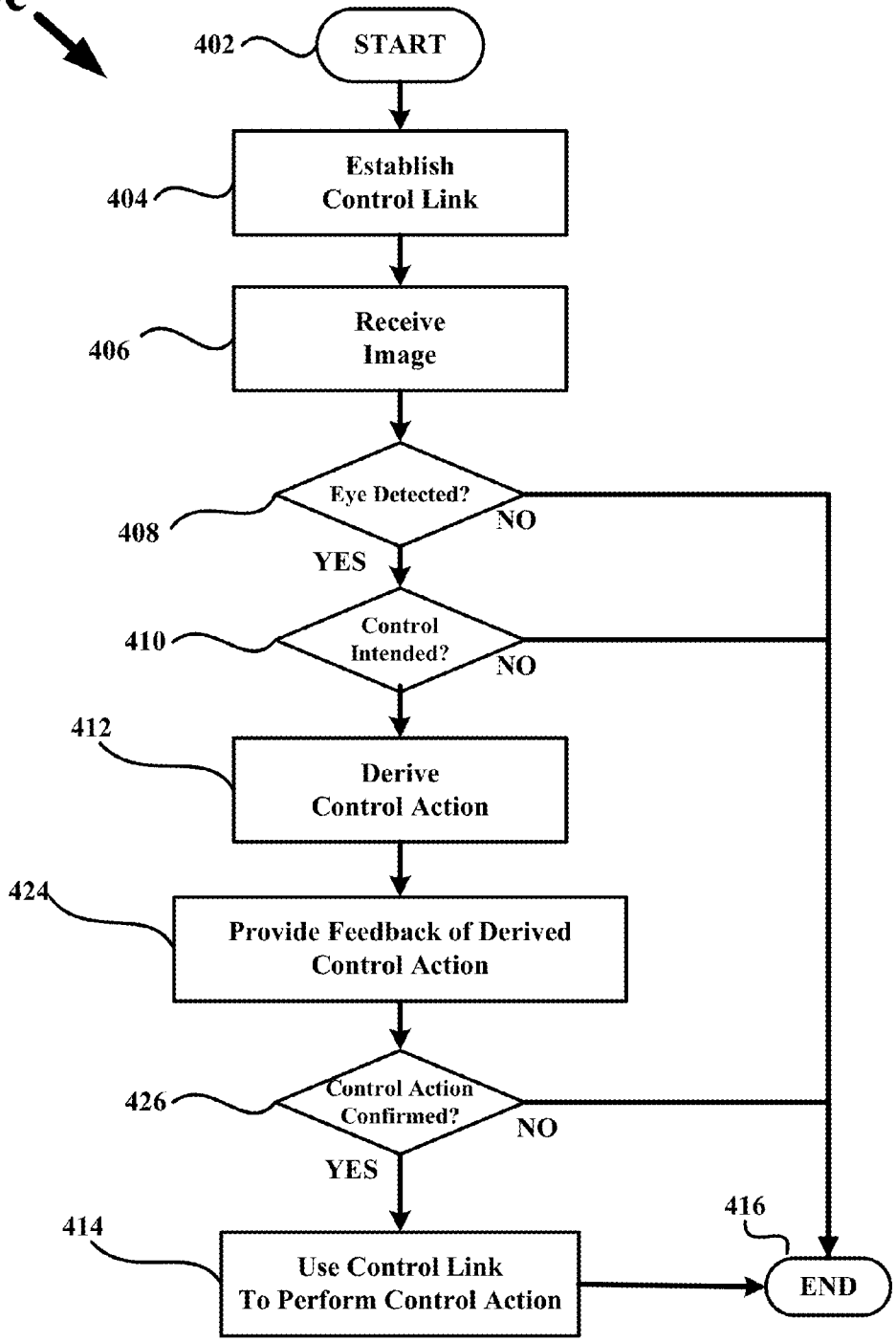
FIG. 4C illustrates another an example of a flow for controlling an electronic device by an eye-controlled user interface, according to some examples.

FIG. 4C illustrates another example of a flow for controlling an electronic device by an eye-controlled user interface, according to various embodiments. As shown, flow 400c starts at 402, after which a control link is established at 404. At 406, an image is received and an evaluation is made whether an eye and/or its characteristics are detected at 408. If an eye is detected, flow 400c evaluates whether a user is intending to control operation at 410. If control is intended, flow 400c provides for deriving a control action at 412. At 424, feedback of the derived control action is provided. At 426, an evaluation is performed to determine whether the control action is confirmed, and flow 400c provides for the use of a control link to perform the control action at 414. Flow 400c terminates at 416. Note that if an eye is not detected at 408, or if it is determined that a control action is not intended at 410, or if the derived control action is not confirmed at 426, flow 400c may end at 416.

Note that regarding flows 400a, 400b, and 400c of FIGS. 4A, 4B, and 4C, an eye-controlled user interface described herein may further include an authorization flow portion. In particular, detecting an eye 408 may further include comparing a detected eye to a known and previously-authorized eye to determine whether a user is authorized. For example, a data arrangement of eye characteristics may constitute a data pattern with which to match against candidate patterns of eye characteristics to determine whether a match exists (e.g., whether authorization is permitted). Alternatively, detecting an eye at 408 may further include detecting a user's head and comparing the detected head to a known and previously-authorized head to determine whether the user is authorized. Alternatively, detecting an eye at 408 may further include detecting a user's face and comparing the detected face to a known and previously-authorized head to determine whether the user is authorized. In some embodiments. Referring to FIGS. 4A, 4B, and 4C, if it is determined that the user is not authorized, flows 400*a*, 400*b*, and 400*c* may terminate and transition to 416, at which the flows end without performing control action 414.

Figure 5:
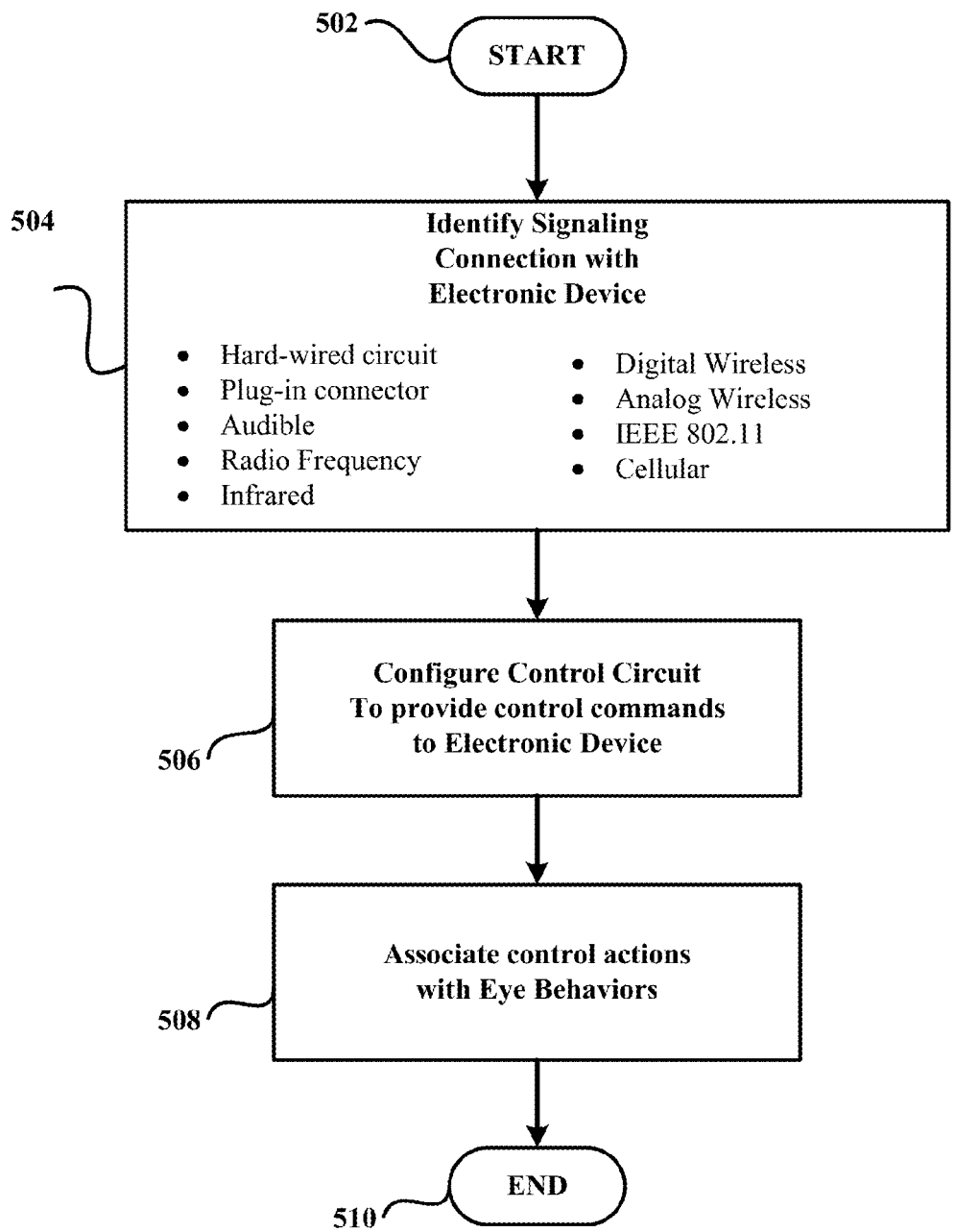
FIG. 5 illustrates an exemplary flow for establishing a control link between an electronic device and an eye-controlled user interface, according to some examples.

FIG. 5 illustrates an exemplary flow for establishing a control link between an electronic device and an eye-controlled user interface, according to various embodiments. In some examples, eye-controlled user interfaces establish a data link to perform control actions on an electronic device. As shown, flow 500, starting at 502, includes identifying a signaling connection with the electronic device at 504. A signaling connection is configured to enable an eye-controlled user interface to provide commands to and control the electronic device. In some examples, a signaling connection can include a hard-wired circuit, including one or more wires connected to the electronic device and configured to transmit commands to the electronic device. In other examples, a signaling connection can include a plug-in connector, such as a universal serial bus ("USB") connector, a digital video interface ("DVI", including "DVI-D," "DVI-A," and "DVI-I") connector, a High-Definition Multimedia Interface ("HDMI") connector, a Radio Corporation of America ("RCA") connector, a Sony/Philips Digital Interface Format ("S/PDIF") connector, or other connector, without limitation, capable of conveying command data. In further examples, a signaling connection can comprise an audio connection, including, for example, audio channels utilizing audio frequencies at or above the human hearing threshold. Further examples of a signaling connection include communicating over a radio frequency channel, an IEEE 802.11 WiFi channel, a cellular channel, or Digital or Wireless telecommunication channels. Still other examples of a signaling connection include communicating with a device over a wired or wireless network. For example, each of the aforementioned signaling connections defines a communication protocol to which signaling communications may comply to send or receive data. In some examples, sending or receiving data to or from a device may include an eye-controlled user interface executing a communication protocol instruction set or program code to conform data transmission to a data communication protocol, such as TCP/IP, Bluetooth, or the like.

Flow 500 further includes configuring a control circuit to provide control commands to the electronic device at 506. In some examples, a data communication protocol may be used to establish a data communication link with an electronic device, as described above, which can be stored in a memory accessible to a processor of an eye-controlled user interface. A data communication protocol can be programmed during manufacture, for example, or at another point during the development or practice of the aforementioned techniques. Alternatively, a data communication protocols may be selected manually by a user of eye-controlled user interface.

Flow 500 further includes associating control actions with eye behaviors at 508, and ending at 510. Examples of eye behaviors are described herein and in conjunction with FIG. 6 and or any other figure.

Figure 6A:
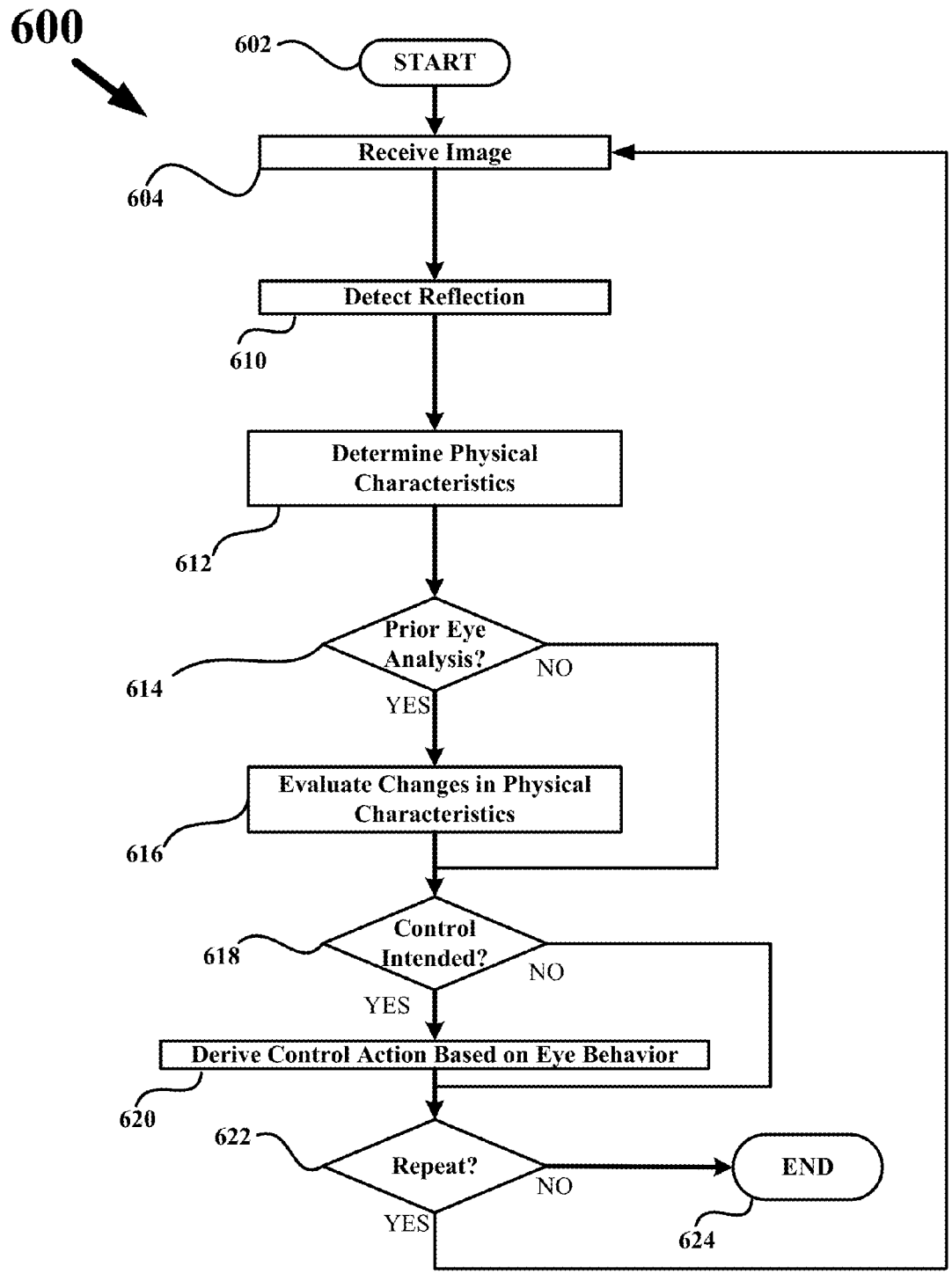
FIG. 6A illustrates an exemplary flow for analyzing an eye, according to some examples.

FIG. 6 illustrates an exemplary flow diagram for analyzing an eye according to various embodiments. Flow 600 starts at 602, after which an image is receive at 604 and a reflection is detected at 610. According to various embodiments, and one or more eyes are detected as well as associated positions (e.g., spatial positions, distances, etc. relative to an image capture sensor that captures light based on one or more sources of light that reflect (e.g., as a specular reflection, diffuse reflections, etc.), refract, impinge, or otherwise changes directions (e.g., at an outgoing direction different that an incoming direction). The one or more reflections may emanate from any one or more surfaces of any structures of the eye (e.g., a pupil, an iris, a sclera, a retina, a lens, cornea, fluid in there between, etc.) or adjacent structures (e.g., eyelids, cheeks, facial surfaces, etc.). At 612, eye-related characteristics (e.g., physical characteristics) may be determined in accordance with various techniques, such as one or more of those described herein.

At 614, a determination is made as to whether a prior eye analysis has been conducted relative to a user, a particular eyeball, a particular condition, one or more events (e.g., verbal commands, electronic messaging to initiate action, or other contextual events), and the like. In some cases, and eye-controlled interface is configured to store and accumulate prior interactions and results from analyzing eyeball characteristics previously. In some examples, an eye-controlled interface is configured to correlate data representing eye-related characteristics, which may include physical characteristics, contextual characteristics, environmental characteristics, and other relevant characteristics, over any period of time to evaluate and to form trend data. Accordingly, the trend data may be used to predict a user's intent to invoke an action by way of gazing or visually focusing one or more visual elements associated with corresponding actions. Further, appeared of time may include a duration in which a user's line-of-sight varies from one into the room to another at of the room, whereby visual elements associated with an eye-controlled interface are disposed. In this case, eye-related characteristics include time-varying eye behaviors, such as saccades, that may be analyzed and correlated with other data, such as positional data.

At 616, flow 600 provides for evaluating changes in eye-related characteristics (e.g., physical characteristics and/or eye-orientation characteristics). From such an analysis, including the detection of one or more changes in characteristics, intended control may be determined at 618. At 620, a control action may be derived or otherwise invoked based on behavior of an eye. For example, a control action may be derived in reference or in association with one or more eye behaviors to a control action, an example of which is described at 508 of flow 500 in FIG. 5. Further, a decision is made whether to repeat the above-described flow at 622, whereby flow 600 returns to receive an image at 604. If the flow should not repeat at 622, the flow terminates at 624. Examples of physical characteristics and deriving a user's intent are described further below (e.g., FIGS. 7A to 8) and at other portions of the present disclosure.

Examples of eye behavior as used at 620 include both instantaneous (e.g., real-time or near real-time) and time-varying (i.e., variable over a period of time) eye behaviors. In some examples, a received image at 604 may include more than one eye, in which case flow 600 may be configured to analyze one of the eyes, a subset of the eyes, all of the eyes, or any number of eyes (e.g., multiple sets of eyes may be analyzed), without limitation. Examples of eye behaviors include, without limitation, whether a user is looking toward visual feature, looking away from a visual feature, looking above, below, to the left, or to the right relative to a visual feature, or looking away from a visual feature by a given deviation, the deviation being indicated in terms of an angular dimension, a distance, a percentage, rate of scanning from one location to other locations (e.g., including saccades), or other mathematical terms.

Other examples of eye behaviors may be implemented, and are not limited to those described above. Still other examples of eye behaviors include, without limitation, whether a user 1) has started looking toward a visual feature, 2) has been looking toward a visual feature for a given period of time, 3) has looked away from a visual feature, 4) has not looked at a visual feature for a given period of time, 5) has been oriented in a given direction for a given period of time, or 6) has moved toward or away from a visual feature at a given speed, among others. Other eye behaviors may be implemented or otherwise detected (e.g., to determine intent to cause invocation of an action), and the examples of time-varying behaviors are not limited to those described above. Further examples of time-varying eye behaviors include saccades, which, as used herein, refer to movements of an eye with or without reference to movement of a head or other body portion or other structures/entities in view of an eye-controlled interface.

In other examples, determining physical characteristics at 612 may include comparing a received image to a training image in which an eye is oriented toward image sensor 306 of FIG. 3. For example, an eye-controlled interface may be configured to receive eye-related characteristics (e.g., in training mode) to generate a pattern of data that may be used for matching against future captured images that include that eye for purposes of detecting the particular eye or user is present and possibly invoking visual-related actions. In other examples, evaluating orientation (e.g., of an eye or portions thereof) at 626 may include comparing a received image to a training image in which an eye is not oriented toward image sensor 306 of FIG. 3.

According to some embodiments, one or more techniques of calculating or determining eye-related characteristics or eye behaviors, such as instantaneous and time-varying eye behaviors, may be used to define a set of eye behaviors. In view of flows in FIGS. 5 and 6, data defining an model of sets of eye behaviors can be used at 508 to associate control actions with eye behaviors. For example, a time-varying eye behavior of "has been looking toward visual feature" for a given period of time can be associated with a command to "turn on" the electronic device. In some instances, flow 400 of FIG. 4 may implement one or more of instantaneous and time-varying eye behaviors to confirm (or reject) a control action derived at 412 of FIG. 4.

In some examples, flow 600 may be configured to reuse a result of a prior eye analysis identified at 614 to enable a reduction in an amount of processing or power consumption associated with analyzing the received image at 604. The result of the prior eye analysis at 614 may include a result of an analysis of a single prior image or multiple prior images, and may be stored in a memory accessible to a processor of an eye-controlled user interface. In other examples, a rate at which to repeat flow 600 at 622 may be increased or decreased to affect the amount of processing or power consumption associated with analyzing the received image at 604. Other examples of reducing processing requirements and power consumption include configuring when to start flow 600 at 602 or repeat flow 600 at 622, depending on detected motion (e.g., increasing a time period between successive executions of flow 600 when motion is not detected).

Figure 6B:
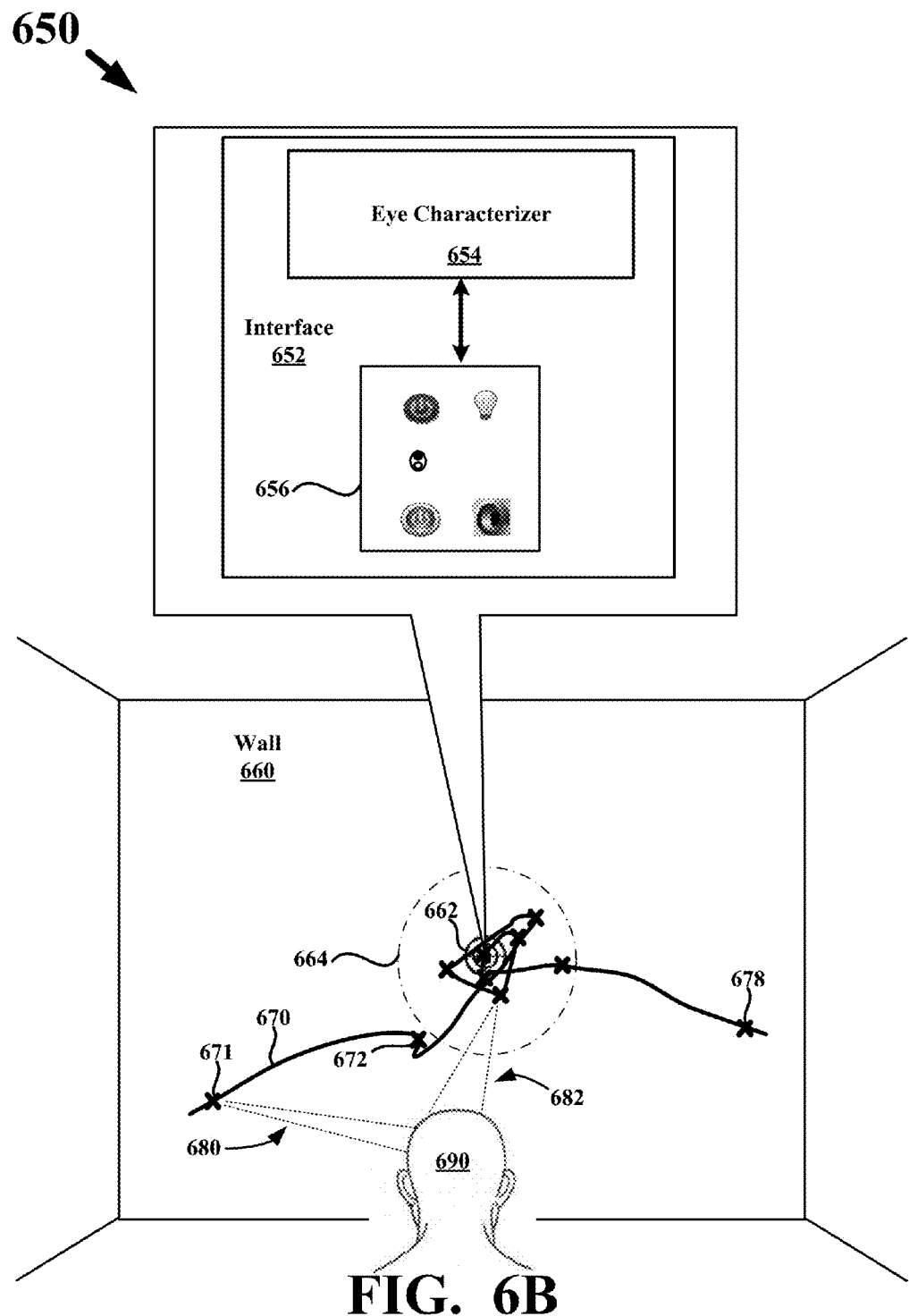
FIG. 6 B depicts an example of an eye characterizer of an eye-controlled interface, according to some examples.

FIG. 6B depicts an example of an eye characterizer of an eye-controlled interface, according to some embodiments. Diagram 650 depicts an interface 652 (e.g., and eye-controlled interface) that includes an eye characterizer 654 and elements 656, including image sensors and visual elements (e.g., points at which a user gazes to invoke one or more different control actions). Further, interface 652 is disposed on a wall 660 of a room at target region 662. Therefore, one or more eyes of a user 690 may span (e.g., from left to right) over path 670 at various rates. Various lines of sight may change angular positions scans points of focus, such as from lines-of-sight 680 to lines-of-sight 682. Interface 652 is configured to detect eye-related characteristics to determine lines of sight 680 and 682, whereby points of focus 671, 672, and 678 may be representative of increases and decreases in angular velocity of an eye relative to a user's gaze (e.g., points of focus may be associated with saccades). Eye characterizer 654 is configured to identify eye-related characteristics to determine points in space at which user 690 is focusing at different time intervals and at different rates of time. Further, interface 652 may determine that a number of points of focus that occur in a region 664 for an interval of time. Upon determining that the numbers of points of focus surpass a threshold (e.g., 15 identified points of focus during a time interval of 10 seconds), interface 652 may conclude that user 690 is intending to focus on a visual element to invoke a command. According to various embodiments, eye characterizer 654 may be implemented in hardware or software, or a combination thereof. For example, eye characterizer 654 may be implemented as a module or otherwise as a set of executable instructions to perform characterization of various attributes of an eye and associated items from which to determine eye-related characteristics and the like.

Figure 7A:
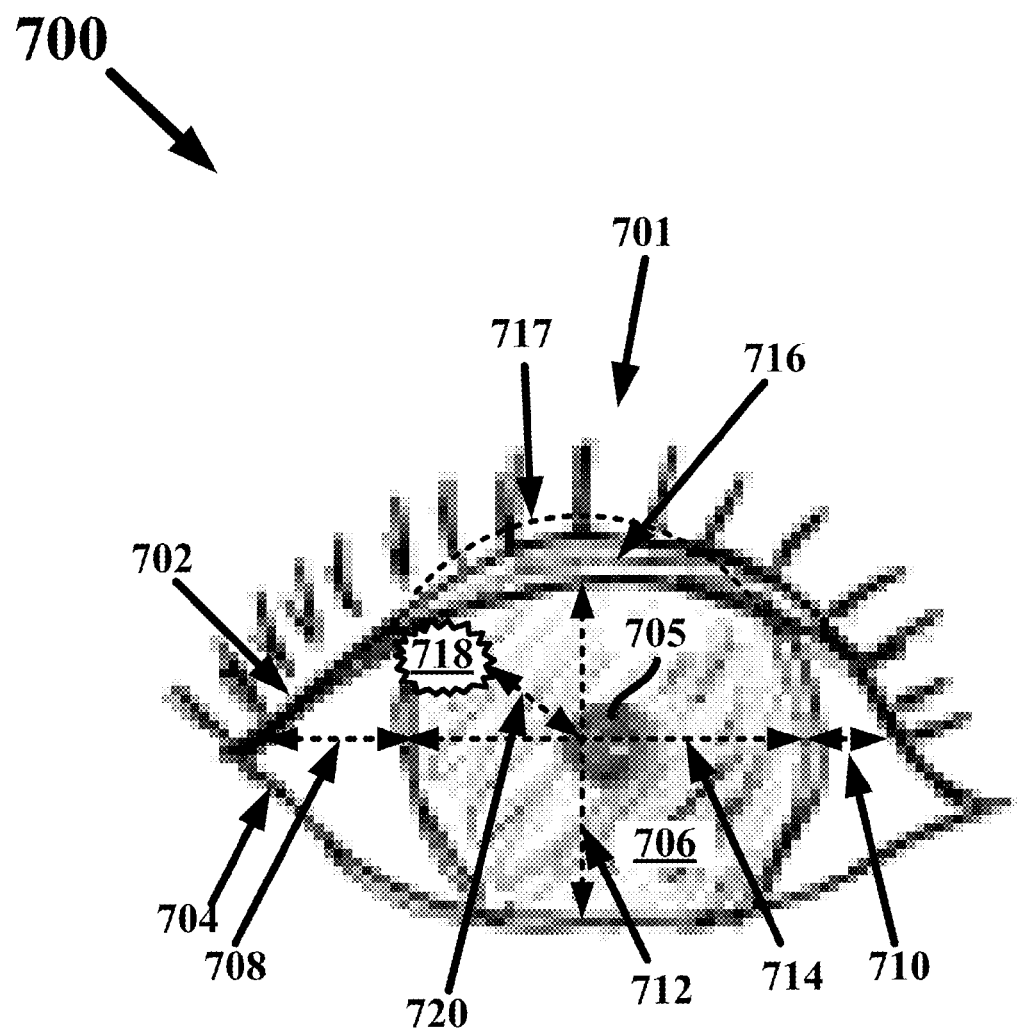
FIG. 7A illustrates exemplary physical characteristics determined and used by an eye-controlled user interface, according to some examples.

FIG. 7A illustrates examples of physical characteristics identified with an eye-controlled user interface, according to various embodiments. Diagram 700 depicts an eye 701 having upper and lower boundaries 702 and 704 (e.g., boundaries coterminous with a demarcation between an eye and surrounding skin), pupil, 705, iris 706, white regions 708 and 710 (e.g., or any portion or region of a sclera), vertical and horizontal pupil axes 712 and 714, an eyelid 716, a reflection 718 (e.g., a point or ray of light reflecting from a surface of any structure of eye 701), and a distance 720 from the reflection to the center point of the pupil. Examples of physical characteristics that may be used to determine an orientation of the eye include, without limitation, a whiteness ratio, as well as other white-related characteristics, an eccentricity ratio, as well as other dimensions, shapes, and other physical eye attributes, primary and secondary reflections, "red-eye" detection (e.g., reflections of light from the back of the retina through pupil 705), and the like.

In some examples, whiteness ratio as used herein, may be the ratio of distance 708 to distance 710 (or visa versa), a number between 0 and 1. As an example, the closer this number is to 1, the greater the eye is oriented toward an image sensor 206 (FIGS. 2A-2F). In an exemplary determination, distances 708 and 710 may be estimated directly based on an image of the eye. Further, an area/surface area for a first eye portion may be compared against an area/surface area for one or more eye portions to determining the relative size (e.g., a number of pixels) to determine the position of the combined pupil 705 and iris 706 within boundaries 702 and 704.

Alternatively, a curve-fitting algorithm can be used to derive an eye curve based on upper edge 702 and lower edge 704, and to derive a pupil curve based on the surfaces or edges of pupil 705, as well as to derive an iris curve based on the surfaces or edges of iris 706. In deriving an exemplary pupil and/or iris curve, an algorithm may account for an occlusion created by eyelid 716 and may predict or otherwise interpolate an edge 717 that otherwise is occluded by eyelid 716. As another example, distances 708 and 710 may be derived by intersecting an eye curve with an exemplary pupil and/or iris curve. In other examples, whiteness ratio, or other measures or attributes thereof, may be determined differently.

In some examples, an eccentricity ratio, as used herein, may be a ratio of the distance 714 to the distance 712, a number between 0 and 1. As an example, the closer the eccentricity ratio is to 1 (e.g., indicative of a circular shape), the greater an eye is oriented toward an image sensor 206 (FIGS. 2A-2F). In an exemplary determination, distances 712 and 714 may be estimated directly or indirectly based on an image of an eye. Alternatively, a curve-fitting algorithm can be used to derive a pupil and/or an iris curve based on the surfaces and edges of pupil 705 and iris 706. Distances 712 and 714 may then be determined as the major and minor axes defining an ellipse representing the pupil or the iris, or both. In other examples, an eccentricity ratio, or other measures or attributes of shapes or structures thereof, may be determined differently.

In some examples, a reflection offset, as used herein, may be a distance 720 from a center of pupil 705 (or of an iris 706) to reflection 718, defines the reflection offset. As an example, the closer the reflection offset is to 0, the more the eye is oriented toward the image sensor. For instance, the shorter distance 720 is, the closer to a line-of-sight associated with a light source causing reflection 718. In an exemplary determination, distance 720 may be estimated directly based on an image of the eye.

Returning to flow 600, as illustrated in FIG. 6, whiteness ratio, eccentricity ratio, and reflection offset may be used as examples of physical characteristics determined at 612, and may be compared to thresholds to determine whether a control action is intended at 618 and/or to derive a control action at 620.

Figure 7B:
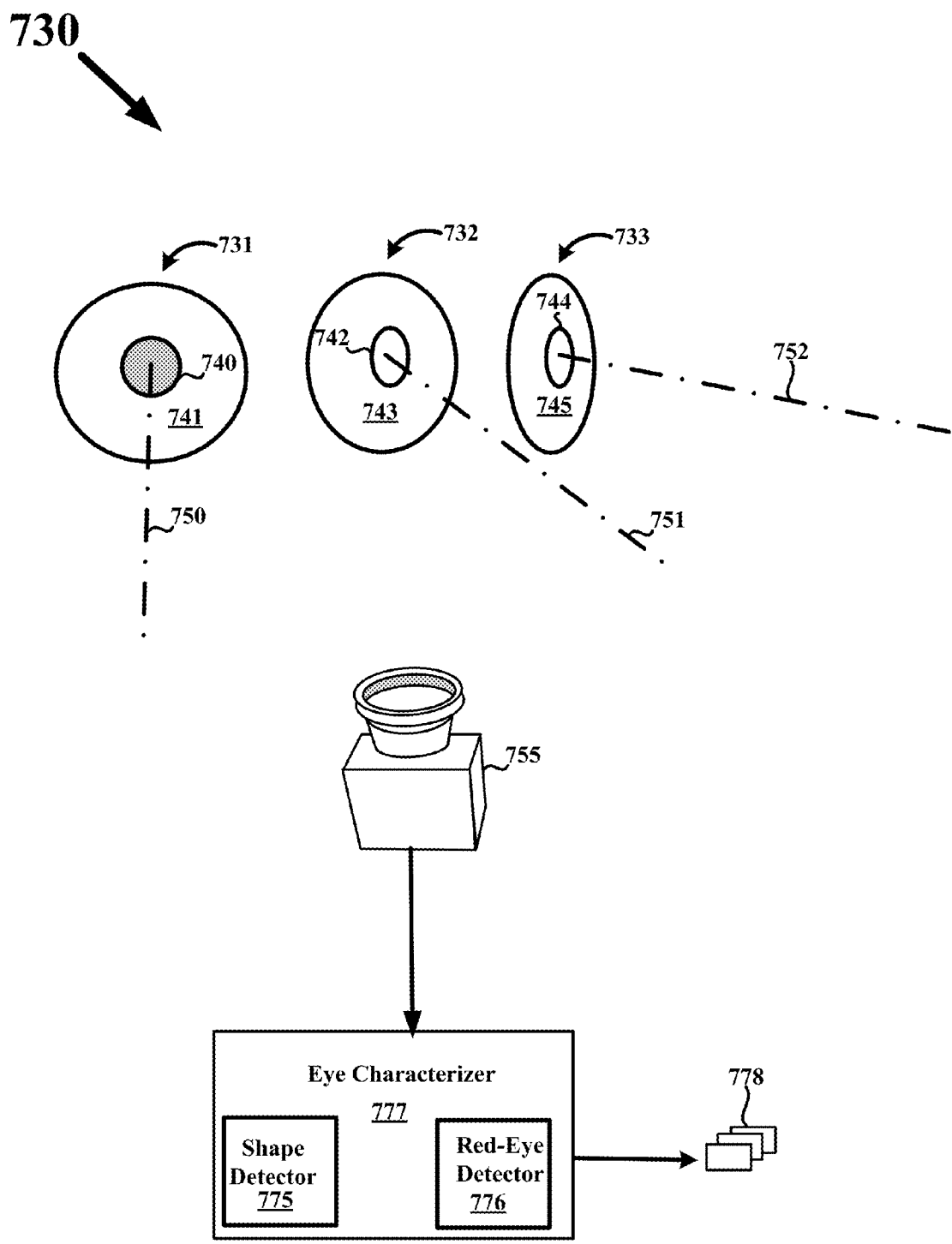
FIG. 7B is a diagram showing an example of an eye characterizer determining lines-of-sight based on characteristics of a portion of an eye, according to some embodiments.

FIG. 7B is a diagram showing an example of an eye characterizer determining lines-of-sight based on characteristics of a portion of an eye, according to some embodiments. Diagram 730 depicts an eye portion 731, an eye portion 732, and an eye portion 733, each oriented along different lines of sight or points of focus. Eye portion 731 includes a pupil 740 and an iris 741, eye portion 732 includes a pupil 742 and an iris 743, and eye portion 733 includes a pupil 744 and an iris 745. Images of eye portions 731, 732 and 733 are captured using image captured device 755, which, in turn, generates data for consumption by an eye characterizer 777. Eye characterizer 777 is shown to include a shape detector 775 and a red-eye detector 776, and further is configured to generate data 778 indicative a direction of a line of sight based on at least detected shapes, such as circular forms, elliptical forms, and other shape patterns against which to match.

To illustrate, consider that shape detector 775 detects that the shapes of its pupil 740 and iris 741 are substantially circular. For example, shape detector 775 determines that the eccentricity of one or more portions of eye portion 731 is indicative of circular shapes. Therefore, eye characterizer 777 can determine a line of sight 750 directed to a focus point substantially coterminous with image capture device 775 (e.g., the user is gazing directly at image device 755 or a visual element disposed adjacent image capture device 755). Further, this conclusion can be confirmed by red-eye detector 776 that is configured to detect a range of light that may be reflected off of the back of the retina and shown through pupil 740 co-linearly along line-of-sight 750. Consider further, shape detector 775 is configured to determine that the shapes of pupil 742 and iris 743 have a slight degree (e.g., a quantifiable degree) of eccentricity. Shape detector 775 is further configured to analyze the shape characteristics of eye portion 732, as well as other eye-related characteristics, to determine or predict a direction of line-of-sight 751, which is indicative that pupil 742 and iris 743 have a greater degree of eccentricity than shapes of eye portion 731. Shape detector 775 is further configured to analyze the shape characteristics of eye portion 733, as well as other eye-related characteristics, to determine or predict a direction of line-of-sight 752, which likely is associated with a focus point located further from a visual element than a focal point associated with line-of-sight 751. According to various embodiments, ranges of eccentricity values may be correlated to one or more directions or lines of sight.

Figure 7C:
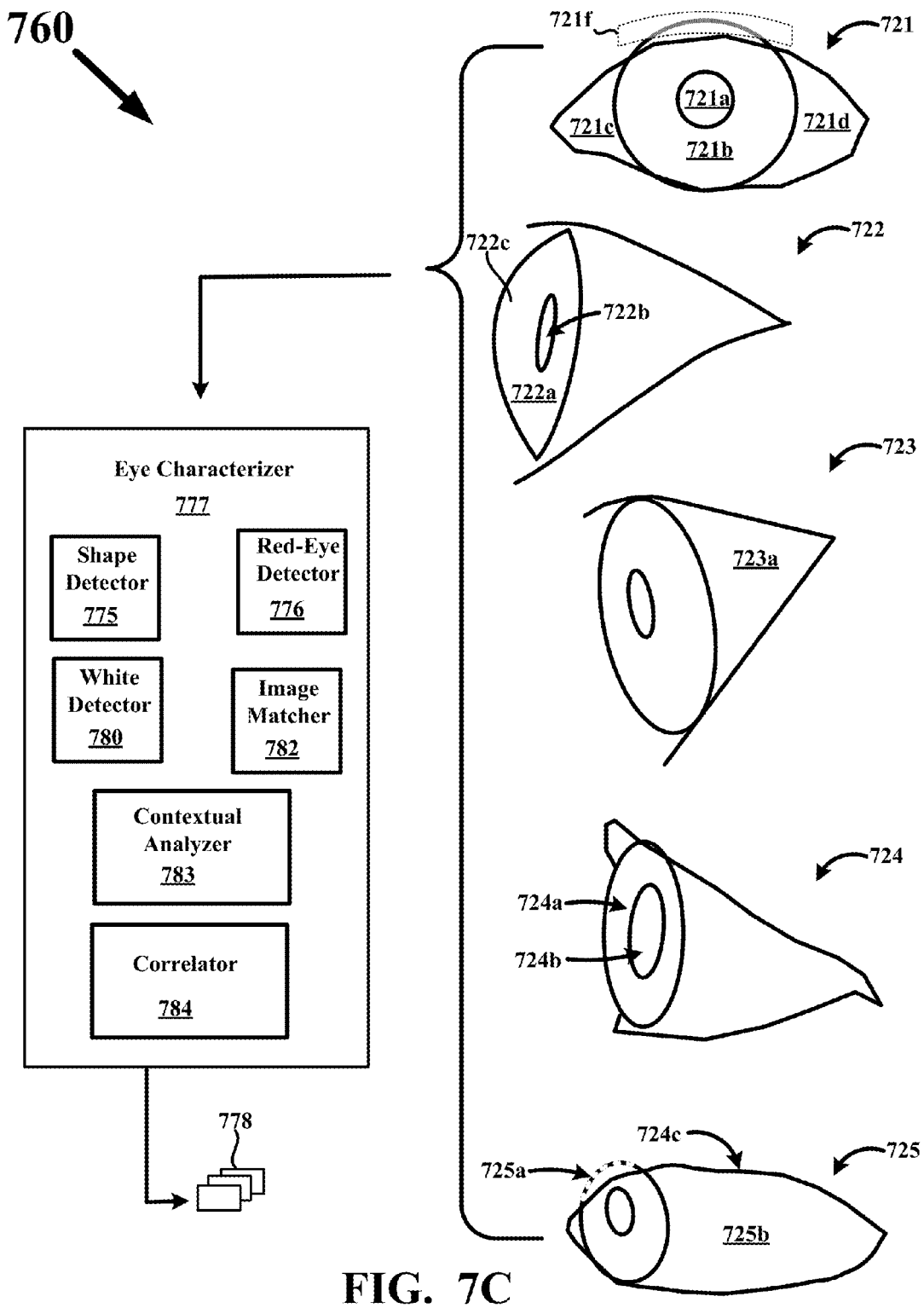
FIG. 7C is a diagram depicting an eye characterizer configured to evaluate and characterize various images of eyes, according to some embodiments.

FIG. 7C is a diagram depicting an eye characterizer configured to evaluate and characterize various images of eyes, according to some embodiments. Diagram 760 depicts an eye characterizer 777 configured to configure a variety of image data 721 to 725 of one or more eyes. Eye characterizer 777 includes a shape detector 775 and a red-eye detector 776, both of which were described in FIG. 7B. Eye characterizer 777 includes a white detector 780 to detect and characterize portions of a sclera (e.g., visible white portions relative to an image capture device). Further, eye characterizer 777 includes an image matcher 782 to match one or more captured images (e.g., pixelated representations of eyes or portions thereof). For example, image matcher may be configured to access a database of numerous images of eyes and eye portions to match against a detected eye. Upon detecting a match, image matcher 782 may generate data indicative of a level of confidence of an orientation of an eye based on a degree of "fit" or closeness of a match. Eye characterizer 777 also includes a contextual analyzer 783 to determine a context in which a user is initiating a "gaze" toward a visual element or otherwise orienting an eye to invoke a control action. For example, eye characterizer 777 may detect that a user is looking a target visual element to invoke a command, but accesses data regarding a context from contextual analyzer 783 to determine that a user generated an electronic message (e.g., from a wearable device or mobile phone) to initiate one or more commands in context with the user's line of sight. As another example, contextual analyzer 783 can determine that ambient light is in a first state (e.g., lights are out using an image sensor), and based on a detected eye and line of sight in the dark, correlator 784 is configured to correlate the one or more states and infer that since it is dark, a user's gaze is intended to turn a light off. Similarly, the gaze may indicate a desire turn off a light if the ambient light is in a second state (e.g., the room is fully lit). Correlator 784 is configured to correlate the one or more outputs or results of other components of eye characterizer 777 or other elements of an eye-controlled interface to detect an eye, determine a line of sight consistent with invoking a command, and causing the command to execute.

As for eye image 721, eye characterizer 777 is configured to detect the shapes and/or eccentricities of pupil 721a and iris 721b to determine a direction of a line of sight. Further, amounts or areas of white 721c and 721d may indicate a similar amount, thereby indicating that an eye is oriented to gaze directly straight-ahead. In some cases, eye characterizer 777 may be configured to extrapolate one or more edge portions 721f that may be occluded by an eye lid to determine the shape or eccentricity of a portion of an eye. As for eye image 722, eye characterizer 777 is configured to detect the shapes and/or eccentricities of pupil 722b and iris 722a to determine a direction of a line of sight. In this case, eye image 722 is a side view such that the shape of a cornea causes a surface of the eye or iris to appear as a semispherical or hemispheric shape. In a range of such shapes, data representing the contours of portions of eye portion 722 may be used to match against other shapes (e.g., in a database) to derive a predetermined line of sight.

As for eye image 723, eye characterizer 777 is configured to detect a white portion 723a to determine a direction of a line of sight as a function of an amount of detected surface area of the sclera. As for eye image 724, eye characterizer 777 is configured to detect a size (e.g., surface area) of pupil 724a relative to a size (e.g., surface area) of iris 724a to determine that pupil 724a is dilated. From this and other contextual information (e.g., time of day), correlator 784 may be configured to determine that the user's eye is dilated due to a lack of ambient light. As the user sets their gaze toward a visual element, red-eye detector 776 may determine the size of the dilated pupil. From the aforementioned, contextual analyzer 783 can determine that it is night and the user desires to activate an electronic device, such as a light. After activation, eye characterizer 777 may continue to observer the eye to determine whether the pupil reduces in size to confirm that the previous state related to a lack of ambient light.

As for eye image 725, eye characterizer 777 is configured to detect a white portion 725a to determine a direction of a line of sight as a function of an amount of detected surface area of the sclera. In this example, a relatively large surface area of "white" is detected, which is consistent with a front-facing individual with an eye looking out the corner of boundaries 724c. Also, eye characterizer 777 can be configured to approximate shape portions 725a extending under eyelids to perform shape detection and correlation.

Figure 8:
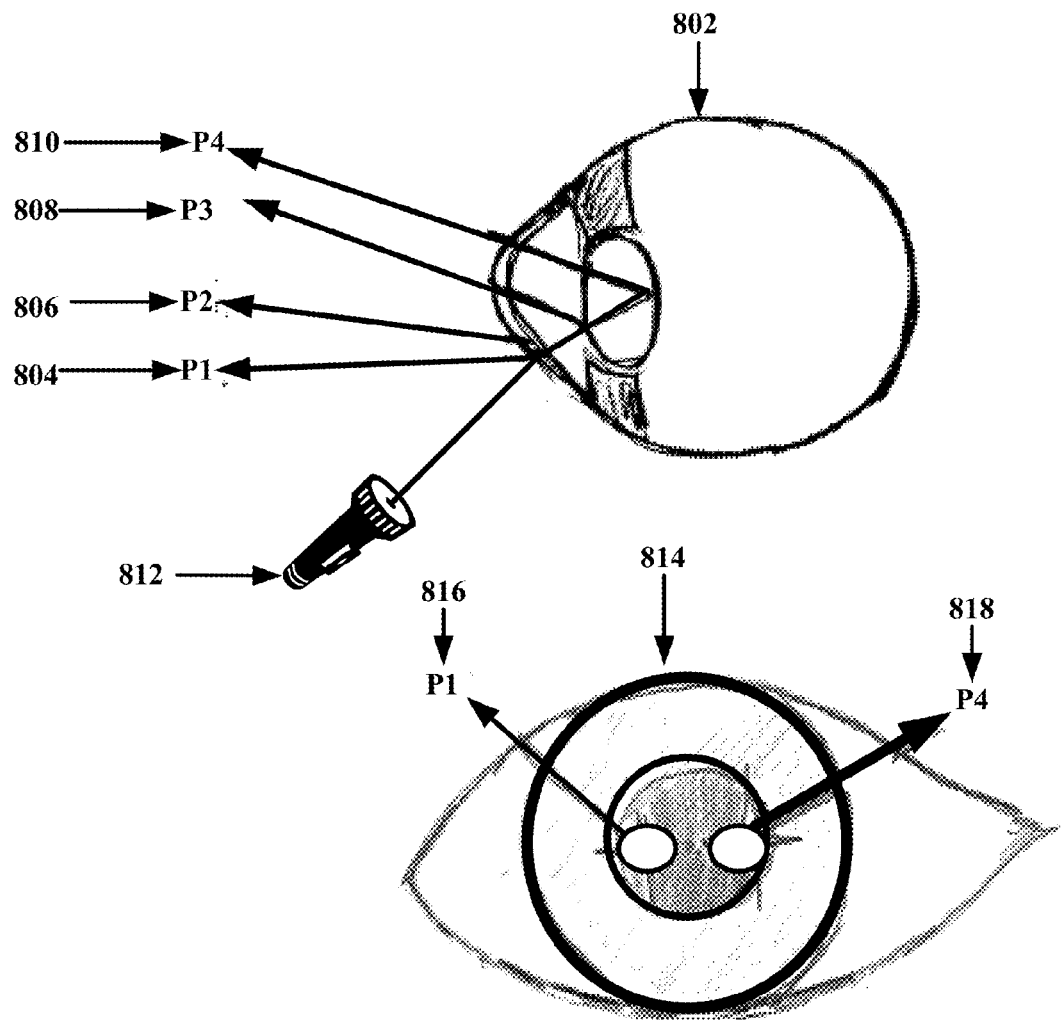
FIG. 8 illustrates exemplary cross sectional and frontal views of an eye, showing Purkinje reflections used by an eye-controlled user interface, according to various embodiments.

FIG. 8 illustrates exemplary cross sectional and frontal views of an eye, showing Purkinje reflections used by an eye-controlled user interface according to various embodiments. Here, cross section view 802 of eye 800 illustrates reflections 804, 806, 808, and 810 caused by reflecting a light source 812 from various eye surfaces, and frontal view 814 illustrates reflections 816 and 818. In some examples, reflections 804 and 816 may be referred to as the first Purkinje reflection, or P1. As shown in the cross section 802, reflection 804 is the reflection of light source 812 from the outer surface of the cornea of eye 802. In some examples, reflection 806 may be referred to as the second Purkinje reflection, or P2. As shown in the cross section 802, reflection 806 is the reflection of light source 812 from the inner surface of the cornea of eye 802. In some examples, reflection 808 may be referred to as the third Purkinje reflection, or P3. As shown in the cross section 802, reflection 808 is the reflection of light source 812 from the outer surface of the lens of eye 802. In some examples, reflections 810 and 818 may be referred to as the fourth Purkinje reflection, or P4. As shown in the cross section 802, reflection 810 is the reflection of light source 812 from the inner surface of the lens of eye 802. In one example, the smaller the distances from the center of pupil 706, the more the eyeball is oriented toward the image sensor.

Returning to flow 600, as illustrated in FIG. 6, the distances from the center of pupil 705/iris 706 to the Purkinje reflections may be compared to thresholds to determine whether a control action is intended at 618 and to derive the control action at 620.

Figure 9:
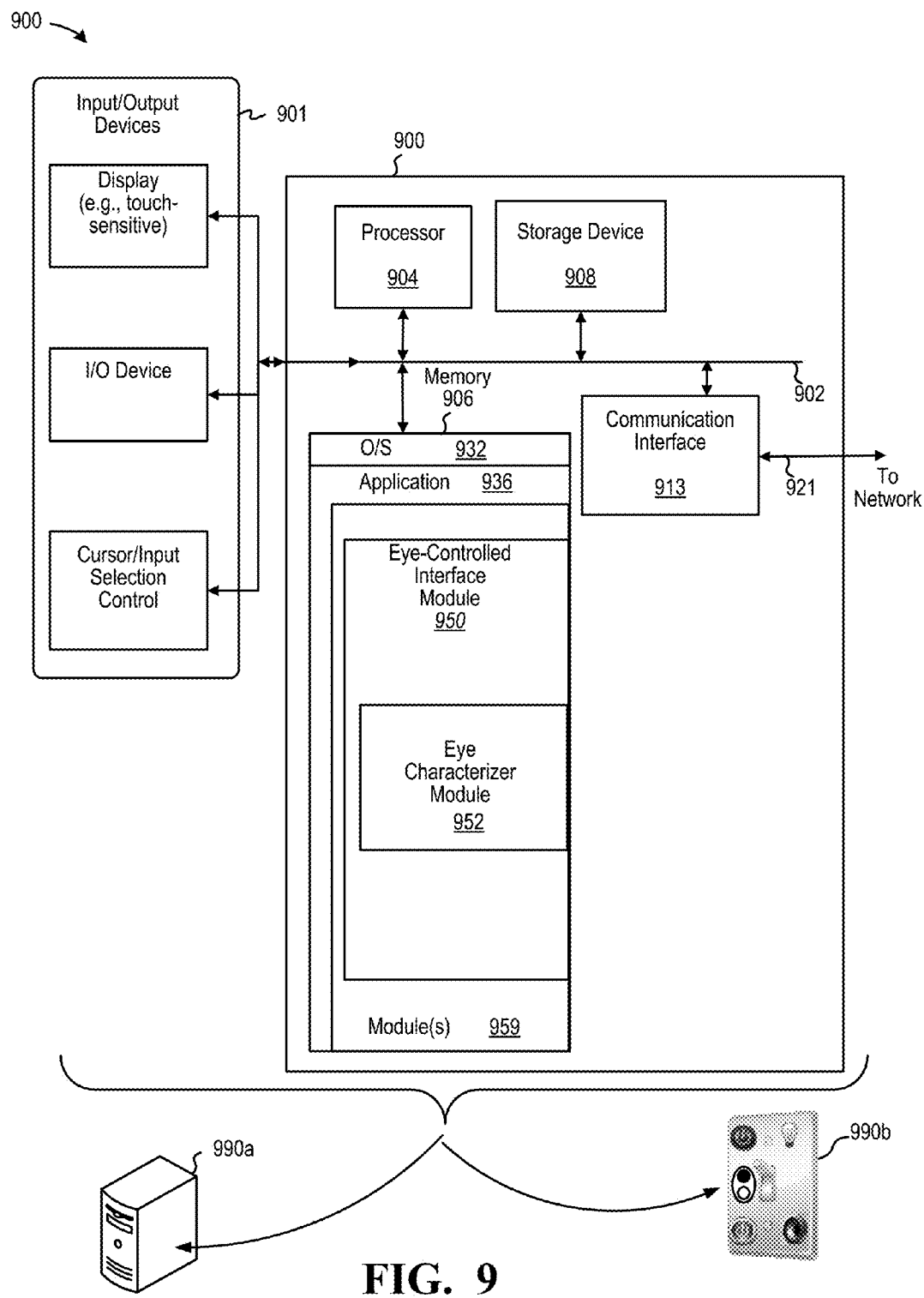
FIG. 9 illustrates an exemplary computing platform disposed in a computing system configured to determine eye-related characteristics to determine an intent of user, via an eye orientation, to perform one or more actions, according to various embodiments.

FIG. 9 illustrates an exemplary computing platform disposed in a computing system configured to determine eye-related characteristics to determine an intent of user, via an eye orientation, to perform one or more actions, according to various embodiments. In some examples, computing platform 900 may be used to implement computer programs, applications, methods, processes, algorithms, or other software to perform the above-described techniques.

In some cases, computing platform 900 can be disposed in any device, such as a computing device 990a, or in association with an eye-controlled interface 990b.

Computing platform 900 includes a bus 902 or other communication mechanism for communicating information, which interconnects subsystems and devices, such as processor 904, system memory 906 (e.g., RAM, etc.), storage device 908 (e.g., ROM, etc.), a communication interface 913 (e.g., an Ethernet or wireless controller, a Bluetooth controller, NFC logic, etc.) to facilitate communications via a port on communication link 921 to communicate, for example, with a computing device, including mobile computing and/or communication devices with processors. Processor 904 can be implemented with one or more central processing units ("CPUs"), such as those manufactured by Intel® Corporation, or one or more virtual processors, as well as any combination of CPUs and virtual processors. Computing platform 900 exchanges data representing inputs and outputs via input-and-output devices 901, including, but not limited to, keyboards, mice, audio inputs (e.g., speech-to-text devices), user interfaces, displays, monitors, cursors, touch-sensitive displays, LCD or LED displays, and other I/O-related devices.

According to some examples, computing platform 900 performs specific operations by processor 904 executing one or more sequences of one or more instructions stored in system memory 906, and computing platform 900 can be implemented in a client-server arrangement, peer-to-peer arrangement, or as any mobile computing device, including smart phones and the like. Such instructions or data may be read into system memory 906 from another computer readable medium, such as storage device 908. In some examples, hard-wired circuitry may be used in place of or in combination with software instructions for implementation. Instructions may be embedded in software or firmware. The term "computer readable medium" refers to any tangible medium that participates in providing instructions to processor 904 for execution. Such a medium may take many forms, including but not limited to, non-volatile media and volatile media. Non-volatile media includes, for example, optical or magnetic disks and the like. Volatile media includes dynamic memory, such as system memory 906.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 902 for transmitting a computer data signal.

In some examples, execution of the sequences of instructions may be performed by computing platform 900. According to some examples, computing platform 900 can be coupled by communication link 921 (e.g., a wired network, such as LAN, PSTN, or any wireless network, including WiFi of various standards and protocols, Blue Tooth®, NFC, Zig-Bee, etc.) to any other processor to perform the sequence of instructions in coordination with (or asynchronous to) one another. Computing platform 900 may transmit and receive messages, data, and instructions, including program code (e.g., application code) through communication link 921 and communication interface 913. Received program code may be executed by processor 904 as it is received, and/or stored in memory 906 or other non-volatile storage for later execution.

In the example shown, system memory 906 can include various modules that include executable instructions to implement functionalities described herein. System memory 906 may include an operating system ("O/S") 932, as well as an application 936 and/or logic module(s) 959. In the example shown, system memory 906 includes an eye-controlled interface module 950, which includes an eye characterizer module 952, or one or more portions of which, can be configured to facilitate customized identification of vacation rental properties, or other product items, based on one or more sources of unstructured data in a distributed computing system by implementing one or more functions described herein.

In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, eye-controlled interface module 950, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 959 and eye-controlled interface module 950, or one or more of its components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figure can represent one or more algorithms. Or, at least one of the elements can represent a portion of logic including a portion of hardware configured to provide constituent structures and/or functionalities.

For example, an eye-controlled interface module 950, or one or more of its components, or any process or device described herein, can be implemented in one or more computing devices (i.e., any mobile computing device, such as a wearable device, an audio device (such as headphones or a headset) or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, customized property listing selector module 950, or one or more of its components, or any process or device described herein, can be implemented in one or more computing devices that include one or more circuits. Thus, at least one of the elements in the above-described figures can represent one or more components of hardware. Or, at least one of the elements can represent a portion of logic including a portion of circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:

1. A method, comprising:
    establishing a control link between a device and a visual control circuit, the visual control circuit comprising an image sensor disposed at or adjacent a visual feature, which is substantially proximate to the image sensor to form a control point;
    receiving an image by the image sensor;
    determining one or more eye-related characteristics including:
        deriving an eccentricity-related value based on major and minor axes defining an ellipse associated with an eye, and
        comparing the eccentricity value to an eccentricity threshold associated with a line of sight;
    evaluating the image to determine whether the eye is oriented substantially toward the control point;
    determining whether a control action is intended, and, if the control action is intended, deriving the control action; and
    causing initiation of the control action via the control link.

2. The method of claim 1, wherein determining the one or more eye-related characteristics comprises:
    deriving a whiteness characteristic and comparing the whiteness characteristic to a whiteness threshold associated with a threshold surface area for a line of sight,
    wherein the device is disposed separately from the visual control circuit.

3. The method of claim 1, further comprising:
    providing a light source disposed substantially proximate to the control point; and
    wherein evaluating the image to detect the eye further comprises detecting a reflection of the light source in association with the eye, and, if the reflection is detected, measuring a distance between the reflection and a center of the eye, and comparing the distance to a threshold distance.

4. The method of claim 3, wherein the light source is configured to provide light of a predetermined frequency; and
    wherein receiving the image further comprises filtering the received image to substantially reduce light other than light of the predetermined frequency.

5. The method of claim 1, further comprising:
    receiving a plurality of subsequent images from the image sensor;
    wherein evaluating the image to detect the eye further comprises evaluating each of the plurality of subsequent images to detect the eye, and, if the eye is detected, determining a location of the eye and a coarse orientation of the eye, the course orientation indicating whether the eye is substantially oriented, above, below, to the left, or to the right of the control point, and using the location and the coarse orientation to generate a saccade; and
    wherein determining whether the control action is intended further comprises using the saccade.

6. The method of claim 1, further comprising:
    providing another visual feature disposed at another control point;
    receiving a plurality of subsequent images from the image sensor;
    wherein evaluating the image to detect the eye further comprises evaluating each of the plurality of subsequent images to detect the eye, and, if the eye is detected, evaluating whether the eye is oriented substantially toward the control point, or toward the another control point, or neither.

7. The method of claim 1, further comprising:
    authorizing a user before performing the control action,
    wherein evaluating the image to detect the eye further comprises comparing the eye to one or more known eyes, the known eyes belonging to authorized users; and, if the eye does not match any of the known eyes, not performing the control action.

8. The method of claim 1, further comprising:
    receiving a plurality of subsequent images from the image sensor; and
    wherein evaluating the image to detect the eye includes detecting the eye while the eye is in motion.

9. The method of claim 4, further comprising:
    providing a visual or audible notification representing the control action; and
    wherein determining whether the control action is intended and deriving the control action further comprises using the saccade to confirm the derived control action.

10. A device, comprising:
    a visual control circuit comprising an image sensor, a visual feature disposed substantially proximate to the image sensor at a control point, a processor, and a wired or wireless communication interface configured to communicate with an electronic device;
    the processor configured to execute instructions to:
    receive an image by the image sensor;
    determine one or more eye-related characteristics including:
        derive an eccentricity-related value based on major and minor axes defining an ellipse associated with an eye, and
        compare the eccentricity value to an eccentricity threshold associated with a line of sight;
    evaluate the image to determine whether the eye is oriented substantially toward the control point;
    determine whether a control action is intended, and, if the control action is intended, derive the control action; and
    use the communication interface to convey the control action to the electronic device.

11. The device of claim 10, wherein the communication interface is configured to use one or more of a hard-wired circuit connection, a plug-in connection, an audible connection, a digital wireless connection, an analog wireless connection, a radio frequency connection, a wired network connection, a wireless network connection, a cellular network connection, or an infrared connection.

12. The device of claim 10, providing another visual feature disposed at another control point;
    wherein the processor is further configured to:

receive a plurality of subsequent images from the image sensor;

evaluate each of the plurality of subsequent images to detect the eye, and, if the eye is detected, evaluate whether the eye is oriented substantially toward the control point, or toward the another control point, or neither.

13. The device of claim 10, further comprising:

a lens configured to substantially focus light associated with the received image on the image sensor.

14. The device of claim 10, further comprising:

a feedback circuit comprising a visual source, the visual source being used to provide a notification representative of the derived control action.

15. The device of claim 14, wherein the processor is further configured to executed instructions to:

receive a plurality of subsequent images from the image sensor; and evaluate the plurality of subsequent images to determine whether to confirm the derived control action, or to reject and regenerate the derived control action.

16. The device of claim 10, further comprising:

a light source; and wherein the processor is further configured to evaluate the received image to detect one or more reflections of the light source.

17. The device of claim 16, wherein the light source is configured to provide light of a predetermined wavelength;

the device further comprising a filter configured to filter the received image to substantially reduce light not having the predetermined wavelength.

18. A non-transitory computer readable medium including instructions for performing a process, the process comprising:

establishing a control link between a device and a visual control circuit, the visual control circuit comprising an image sensor and a visual feature disposed substantially proximate to the image sensor at a control point;

receiving an image by the image sensor;

determining one or more eye-related characteristics including:

deriving an eccentricity-related value based on major and minor axes defining an ellipse associated with an eye, and comparing the eccentricity value to an eccentricity threshold associated with a line of sight;

evaluating the image to determine whether the eye is oriented substantially toward the control point;

determining whether a control action is intended, and, if the control action is intended, deriving the control action; and using the control link to perform the control action.

19. The non-transitory computer readable medium of claim 18, further including instructions for performing another process, the another process comprising:

evaluating the received image to detect the eye further comprises detecting a reflection of a light source on the eye, and, if the refection is detected, measuring a distance between the reflection and a center of the eye, and comparing the distance to a threshold distance.

* * * * *